United States Patent
Choudhry et al.

(10) Patent No.: US 12,536,031 B1
(45) Date of Patent: Jan. 27, 2026

(54) OVERLAY NETWORKS OF THIRD-PARTY VIRTUALIZATION FRAMEWORKS USING A CLOUD VIRTUALIZED COMPUTING SERVICE AS UNDERLYING INFRASTRUCTURE

(71) Applicant: Amazon Technologies, Inc., Seattle, WA (US)

(72) Inventors: Akshay Choudhry, Santa Clara, CA (US); Talha Kalim, Mississauga (CA); Shuai Ye, Herndon, VA (US); Matthew Browne Barr, Arlington, VA (US); Aarthi Raju, San Jose, CA (US); Taylor Wilbur Wright, Thomasville, GA (US)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 18/759,434

(22) Filed: Jun. 28, 2024

(51) Int. Cl.
| | |
|---|---|
| *G06F 9/455* | (2018.01) |
| *H04L 45/021* | (2022.01) |
| *H04L 45/76* | (2022.01) |
| *H04L 61/2503* | (2022.01) |

(52) U.S. Cl.
CPC ........ *G06F 9/45558* (2013.01); *H04L 45/021* (2013.01); *H04L 45/76* (2022.05); *H04L 61/2503* (2013.01); *G06F 2009/45595* (2013.01)

(58) Field of Classification Search
CPC ... H04L 45/76; H04L 45/021; H04L 61/2503; G06F 9/4558; G06F 2009/45595
See application file for complete search history.

(56) References Cited

U.S. PATENT DOCUMENTS

| | | | |
|---|---|---|---|
| 9,544,248 B2 | 1/2017 | Banavalikar et al. | |
| 9,747,123 B2 | 8/2017 | Nakajima et al. | |
| 10,778,532 B2 | 9/2020 | DeCusatis et al. | |
| 11,444,855 B2 | 9/2022 | Naik et al. | |
| 11,700,184 B2 | 7/2023 | Strom et al. | |
| 11,736,396 B2 | 8/2023 | Mackie et al. | |
| 2013/0247034 A1* | 9/2013 | Messerli | G06F 9/45533 718/1 |
| 2016/0117185 A1* | 4/2016 | Fang | G06F 9/45558 718/1 |

(Continued)

OTHER PUBLICATIONS

Hu et al.,"Building A Layer-2 Cloud", IEEE 18th Conference on Industrial Electronics and Applications, Aug. 19, 2023.*

(Continued)

*Primary Examiner* — Todd L Barker
(74) *Attorney, Agent, or Firm* — Robert C. Kowert; Kowert, Hood, Munyon, Rankin & Goetzel, P.C.

(57) ABSTRACT

A connectivity manager of an overlay network which is to be set up using resources of a cloud computing environment as an underlay network is instantiated at a computing resource of the cloud. Using routing information of the overlay network, a route server of the cloud modifies a route table of the cloud. An encapsulation tunnel is created between the connectivity manager and a second computing resource at which a hypervisor of the overlay network runs. Based on the modified route table, a network packet from a source outside the overlay network is routed via the connectivity manager and the tunnel to a virtual machine of the overlay network at the second computing resource.

20 Claims, 11 Drawing Sheets

(56) References Cited

U.S. PATENT DOCUMENTS

| | | | |
|---|---|---|---|
| 2020/0183724 A1* | 6/2020 | Shevade | G06F 9/5016 |
| 2021/0288865 A1 | 9/2021 | Ruel et al. | |
| 2022/0272039 A1* | 8/2022 | Cardona | H04L 45/566 |
| 2024/0129371 A1* | 4/2024 | Ead | H04L 63/0807 |

OTHER PUBLICATIONS

Cota et al., "CPE Virtualization by unifying NFV, SDN and Cloud Technologies", 2016 39th International and Communication Technology, Electronics and Microelectronics, Jul. 25, 2016.*

U.S. Appl. No. 17/810,290, filed Jun. 30, 2022, Young Ha Jung, et al.

U.S. Appl. No. 18/336,809, filed Jun. 16, 2023, Yasin Hajizadeh.

* cited by examiner

OVERLAY NETWORKS OF THIRD-PARTY VIRTUALIZATION FRAMEWORKS USING A CLOUD VIRTUALIZED COMPUTING SERVICE AS UNDERLYING INFRASTRUCTURE

BACKGROUND

Cloud provider networks provide an extensive array of virtualized computing and networking features. For example, isolated virtual networks referred to as virtual private clouds (VPCs) comprising virtual machines can be established on behalf of customers, and a variety of logical gateways (such as Internet gateways for traffic between VPCs and the public Internet, virtual private network (VPN) gateways for traffic between VPCs and customer premises via VPN tunnels, and the like) can be set up. In contrast to cloud-based virtualization techniques, some virtualized computing frameworks require customers to provision and manage their own hardware.

Figure 1:
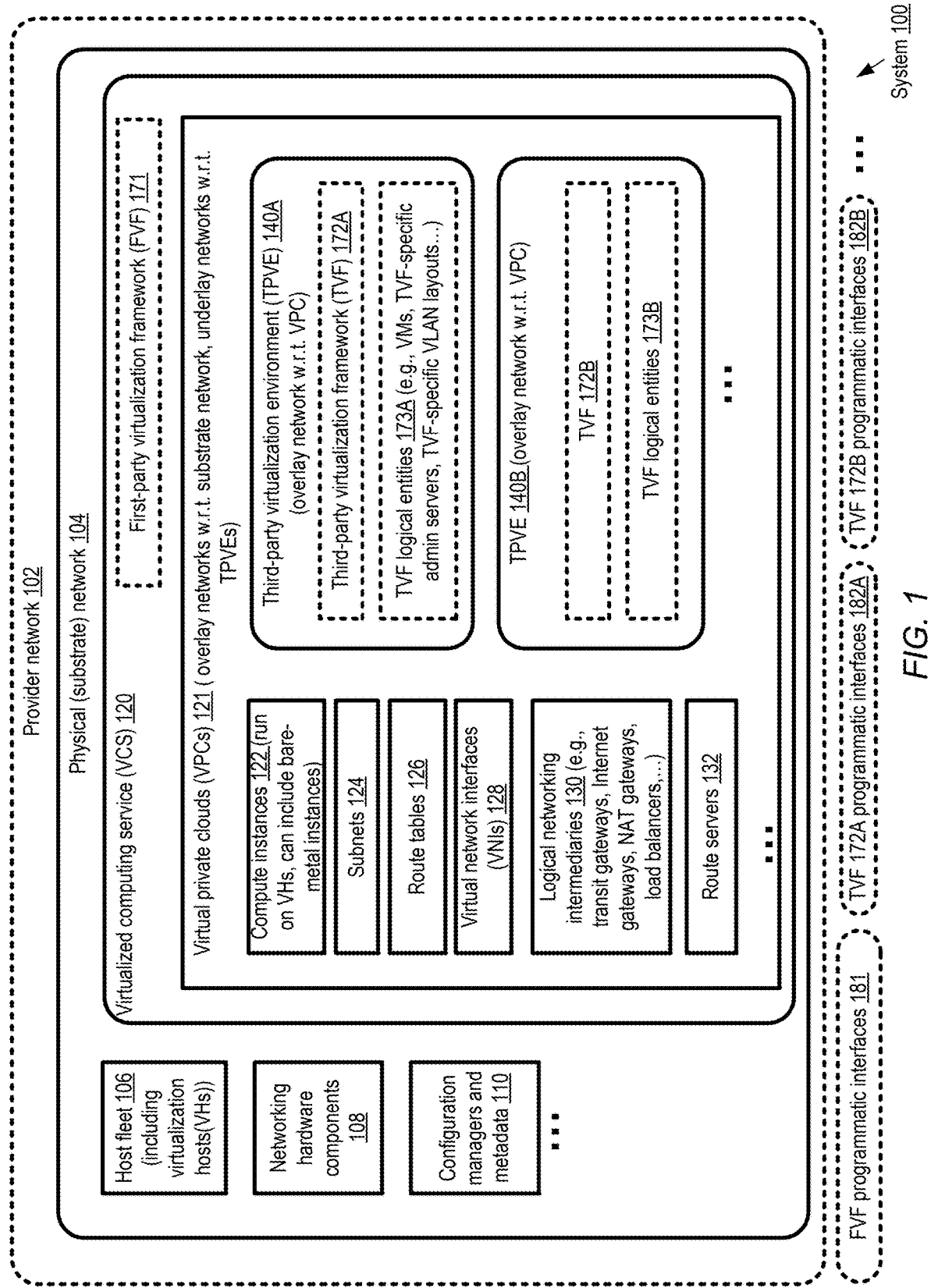
FIG. 1 illustrates an example system environment in which overlay networks of third-party virtualization frameworks may be configured using resources of a cloud-based virtualized computing service as the underlying infrastructure, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

Several types of compute virtualization frameworks or technology stacks are available in the industry. Some virtualization frameworks are offered by cloud provider network operators, enabling customers to use cloud-based hardware for their virtual machines. Other virtualization frameworks typically require customers to provision hardware at their own premises, and use the tools and application programming interfaces (APIs) of the frameworks to configure and manage virtual machines run on the provisioned hardware. Each virtualization framework or stack typically has its own set of supported logical constructs (e.g., compute instances or virtual machines of various categories, hypervisors, networking intermediaries such as gateways/routers, and the like), administrative tools and APIs.

Transitioning a set of applications from one virtualization framework to another can be a daunting task for an organization, as reworking of aspects like networking protocols may potentially be required. For example, while the virtual machines supported by different virtualization frameworks share similarities in using standard networking protocols from the network layer (Layer 3) of the OSI (Open Systems Interconnection) model and above, their implementations differ at the lower layers (ex: data link layer (Layer 2) and physical layer (Layer 1)) due to the different virtualization technologies and infrastructure employed by the respective virtualization frameworks. In addition to such significant application changes, changes to operational processes and management tools may also be needed when migrating from one virtualization framework to another. At the same time, as the complexity of provisioning and managing additional on-premise infrastructure grows, some organizations may wish to use cloud-based infrastructure instead.

These challenges, among others, are addressed by the disclosed systems and techniques that enable users to run their existing virtualization environments on top of a different virtualized environment, such as a cloud provider network. This allows users to migrate to an entirely new environment seamlessly, without having to refactor their applications or change their operational processes. In one example, as described above, the two environments may have different networking protocols and constructs at lower OSI levels. As such, some implementations of the present disclosure provide a networking translation layer to interface between the two virtualization frameworks. This interface layer can give the "base" virtualization environment the ability to support the "migrated" virtualization environment's networking requirements, including overlay networking, north-south connectivity, redundancy and high availability, and specialized subnetworking. By abstracting away these complex networking requirements and mapping the two different networking constructs, the present disclosure allows customers to "lift and shift" from one virtualization environment to another without having to significantly modify their existing networking architectures or operational processes.

In some implementations, the interface layer can be configured to perform operations such as provisioning specific subnetworks ("subnets") to handle different types of network traffic, such as management, underlay, storage, and uplink subnets, as well as creating and configures the necessary network interfaces, route tables, and gateways within these subnets to enable the migrated virtualization environment's overlay networking and connectivity to external networks. As an example, the interface layer can automatically create redundant network edge nodes (networking components that provide routing and connectivity services for an overlay network) with interfaces in the private and public uplink subnets to provide routing services and connectivity between the overlay network and the broader network or Internet. It also can also up BGP peering sessions between network edge nodes and route servers in the base environment to dynamically advertise routes and ensure reliable north-south connectivity. Though described here as a "layer" it will be appreciated that the different functions of this interface can be distributed among different software components in the services of the provider network, or offered as a service of the provider network that integrates with other services to provision necessary resources into the user's account/environment. Such a service may also have additional functionality like managing the lifecycle of the migrated virtualization environment's components and integrating with its management tools.

Accordingly, the present disclosure relates to methods and apparatus for using cloud-based virtualized resources as the underlying infrastructure for easily setting up overlay networks of various other virtualization frameworks. After a brief initial stage of establishing a given overlay network using the cloud-based resources, a customer can use the tools and APIs of their preferred virtualization framework to interact with logical constructs of that framework (now implemented in the cloud) in the same way that those tools and APIs could have been used had the cloud-based resources not been deployed. The underlying cloud-based resources can be provisioned, managed, set up in fault-tolerant or highly available configurations, and scaled automatically using standard cloud service techniques. From the perspective of the cloud provider, the cloud-based virtualized resources, such as compute instances of virtual private clouds (VPCs) of a virtualized computing service (VCS) can be described as being organized and managed using a first-party virtualization framework (FVF), while a virtualization framework used for the customer's overlay network constructs (such as framework-specific categories of virtual machines, virtual local area networks (VLANs), virtual switches, and the like) can be described as a third-party virtualization framework (TVF). A group of virtualized computing resources such as virtual machines of the TVF can collectively be referred to as a third-party virtualization environment (TPVE). The cloud provider can provide an easy-to-use set of tools, scripts or recipes enabling the customer to describe properties of the desired overlay network using terminology similar to that of the TVF and accomplish the corresponding lower-level FVF tasks needed to set up the overlay network using underlying cloud-based resources. In one example scenario, if the networking configuration of the TVF typically comprises a collection of VLANs, while the networking configuration of the underlying FVF typically comprises a collection of VPC subnets and virtual network interfaces (VNIs), the tools provided for the setup of the overlay network may be used to configure a set of VPC subnets and VNIs to which those VLANs can be mapped. Compute instances of the VPCs can be used to run administrative or control-plane components of the TPVE, such as TVF API handlers or network connectivity managers, and to host hypervisors and virtual machines of the TPVE. In some cases, special categories of VCS compute instances referred to as bare-metal instances, in which FVF virtualization-related overhead is minimized and a substantial subset of the underlying hardware is accessible directly to programs such as operating systems run on the instances, can be used for the TPVE hypervisors and virtual machines.

Note that a VPC of a cloud provider network's VCS can itself be considered a type of overlay network, built on top of a substrate comprising the hardware infrastructure of the cloud provider. The substrate can be considered a network fabric containing the physical hardware that runs the services of the provider network, and can include networking devices such as routers and switches, as well as the physical connections among the devices. Thus, in scenarios in which the types of innovations described herein are employed, there are in effect two levels of overlay networks: a first level of overlay network (the VPC and its associated components) built on top of the cloud provider's substrate, and a second level of overlay network (a customer's TPVE) built on top of the first level overlay network.

A VCS can support multiple TVFs. For example, one customer of the VCS can set up a first TPVE TPVE1 using a TVF TVF1 from one vendor, while another customer of the VCS can set up a second TPVE TPVE2 using a second TVF TVF2. The control plane and data plane components of TVF1, as well as the APIs supported by TVF1, can differ from the control plane components, data plane components and APIs of TVF2. For each TVF, the VCS can provide tools enabling VCS customers to easily perform the VCS FVF tasks needed to set up the corresponding TVF components in an overlay network. In some cases, a given VCS customer can set up multiple TPVEs, such as TPVE1 using TVF1 and TPVE using TVF2. Multiple logically isolated TPVEs configured according to the same TVF (similar in concept to distinct VPCs) can also be set up using VCS resources as underlying infrastructure. For example, a given customer can set up TPVE1 comprising a first set of logical constructs of TVF1 to run a first set of applications, and TPVE2 comprising a second set of logical constructs of TVF1 to run a second set of applications which need not necessarily communicate with applications run at TPVE1. Depending on the specifics of the TVF for which an overlay network is to be configured, and/or on the expected network traffic patterns of that overlay network's components, different combinations of VCS features can be employed at the underlay network. To support TPVEs of some TVFs, for example, route servers configured to exchange dynamic routing information pertaining to the overlay network using protocols such as BGP (Border Gateway Protocol), software-defined gateways whose network address translation functions can be disabled, multiplexed VNIs (sometimes referred to as trunk-and-branch VNIs) and the like can be used. For other TPVEs or TVFs, some or all of these features may not be required.

As one skilled in the art will appreciate in light of this disclosure, certain embodiments may be capable of achieving various advantages, including some or all of the following: (a) enabling customer-premise applications and workloads that utilize one kind of virtualization stack or framework to be seamlessly moved to overlay networks set up on underlying virtualized infrastructure organized according to a different virtualization stack or framework of a cloud computing environment and/or (b) quickly enabling higher availability and better scalability for such applications and workloads than would have been achieved at the customer premises.

According to some embodiments, a system may include a distributed configuration manager of a VCS of a cloud computing environment, and a set of virtualization hosts of the cloud computing environment. The configuration manager may comprise one or more software programs run on one or more computing devices. The configuration manager may provide tools such as TVF-specific APIs for setting up the administrative components and virtualization servers used for hosting virtual machines of a TPVE of a customer-selected TVF, and for mapping networking configuration settings of the TPVE into components of one or more VPCs in various embodiments. A VPC may be established at the VCS by the configuration manager on behalf of (e.g., in response to a programmatic request from) a customer or client who wishes to set up an overlay network configured in accordance with a selected TVF. A VPC, also referred to as an isolated virtual network or IVN, may comprise a collection of networked resources (including, for example, compute instances) allocated to a given client, which are logically isolated from (and by default, inaccessible from) resources allocated for other clients in other isolated virtual networks. The client on whose behalf a VPC is established may be granted substantial flexibility regarding network configuration for the FVF resources of the VPC—e.g., private IP addresses for compute instances may be selected by the client without having to consider the possibility that other resources within other VPCs may have been assigned the same IP addresses, subnets of the client's choice may be established within the VPC, security rules similar to firewall rules may be set up by the client for incoming and outgoing traffic with respect to the VPC, and so on.

The configuration manager may instantiate, within a first compute instance of the FVF launched at one of the virtualization hosts in the VPC, an external connectivity manager (ECM) of an overlay network set up at the request of the customer using resources of the VCS as an underlay network or underlying infrastructure in various embodiments. A compute instance may itself comprise a virtual machine configured according to the FVF of the VCS in various embodiments. The ECM may comprise one of the administrative components of the TPVE, set up in accordance with the TVF selected by the customer or client for the overlay network. As suggested by its name, the ECM may be responsible for transferring network packets between overlay network VMs and entities external to the hosts at which the overlay network VMs run in various embodiments.

A number of VPC subnets and virtual network interfaces (VNIs) may be set up in various embodiments to enable traffic of the overlay network to flow in the manner indicated or requested by the customer. A VNI may enable some networking-related attributes such as IP (Internet Protocol) addresses to be transferred relatively easily between compute instances (or other logical entities of the VCS) without necessarily reconfiguring physical network cards. Such attribute transfers may be accomplished, for example, by detaching a VNI programmatically via an API from one compute instance or logical entity and attaching it programmatically to another compute instance or logical entity. In some embodiments, the networking manager may set up at least three subnets within the VPC selected for a TPVE: a private connectivity subnet (PRCS), a tunneling endpoints subnet (TES) for tunneling overlay traffic via the underlay network of the VPC between the virtual machines of the TPVE and an ECM, and a public connectivity subnet (PUCS). VNIs set up in the PRCS may be used for network traffic directed to/from endpoints whose network addresses are not advertised on the public Internet, while VNIs set up in the PUCS may be used for network traffic directed to/from endpoints whose network addresses are advertised on the public Internet. Each such subnet may be assigned a respective CIDR (Classless Inter-Domain Routing) address range in various embodiments. The TES may be referred to as a tunneling subnet, an encapsulation subnet, or an encapsulation endpoints subnet in some embodiments.

A first VNI configured within (e.g., assigned a network address belonging to a subnet address range of) a private connectivity subnet (PRCS) of the VPC may be programmatically attached to the first compute instance (the compute instance hosting the ECM) by the configuration manager in some embodiments. In addition, in at least one embodiment, a second VNI configured within a TES of the VPC may also be programmatically attached to the first compute instance.

A second compute instance, run at a different virtualization host than the first compute instance, may be configured in various embodiments to host a hypervisor and associated virtual machines of the overlay network in various embodiments. In some embodiments the VCS may offer several categories of compute instances, and different categories of instances may be used for administrative components (such as the ECM) than are used for overlay network virtual machines. For example, a bare-metal instance, in which direct access to various physical resources such as CPUs and memory is provided to software instead of using a full-fledged virtualization manager as an intermediary, may be selected to run an TPVE hypervisor and associated TPVE virtual machines (VMs) of the overlay network in one embodiment.

In general, in various embodiments, network addresses may be selected and assigned to TPVE VMs by the customer using TVF tools, and the VPC components may not have direct knowledge of such addresses until the VPC components are informed by the ECM or other overlay network components. In order to enable traffic to flow between a TPVE VM and resources external to the compute instance at which the TPVE VM runs, an encapsulation protocol tunnel (e.g., a tunnel created in accordance with the Geneve [Generic Network Virtualization Environment] protocol) may be set up between the ECM and the compute instance of the TPVE VM in various embodiments. Such a tunnel may be created between a pair of VNIs set up in the TES in one embodiment-one VNI attached to the ECM, and a second VNI attached to the compute instance at which the TPVE VM runs. The configuration manager may programmatically attach the second VNI to the second compute instance.

The configuration manager may set up one or more route servers in various embodiments to populate route tables of the underlay network (the VPC) to enable packets to be routed correctly via the underlay network to the appropriate overlay network components. A dynamic routing information exchange session may also be set up between a route server and the ECM. In some embodiments, a version or variant of BGP (or a similar dynamic routing information exchange protocol) may be used by the route server and the ECM. The route server may modify one or more route tables (e.g., by adding route table entries) associated with the VPC based on overlay network routing information (e.g., IP addresses or address ranges chosen and assigned by the customer to overlay network VMs) received from the ECM via such a session in various embodiments. Based at least in part on the modified route table, network packets directed to a TPVE VM from a source outside the overlay network may be routed to the correct VCS compute instance at which that TPVE VM is run. Such packets may originate, for example, at a customer premise outside the cloud computing environment, or at resources within the cloud computing environment bit not part of the TPVE. In some cases, for example, the packet may first be directed to the ECM by the configuration manager via the VNI attached to the ECM's compute instance in the PRCS, and then be directed from the ECM to the TPVE VM via an encapsulation tunnel between two VNIs in the TES-one VNI attached to the compute instance used for the ECM, and one VNI attached to the compute instance used for the TPVE VM. Outbound packets may be transmitted using the reverse pathway and the routing tables: e.g., a packet originating at a TPVE VM may pass via the TES VNIs and tunnel to the ECM, and then be directed to its destination from the ECM via VCS intermediaries such as transit gateways, Internet gateways, or virtual private gateways set up for connectivity to on-premise networks.

In at least some embodiments, a given TPVE may include several kinds of administrative components or nodes in addition to the ECM, which may each be run at one or more VCS compute instances in the VPC. For example, an administration manager or controller which comprises an API handler of the TVF may be run at one compute instance, a networking manager for intra-TPVE traffic may be run at another compute instance, and so on. In at least one embodiment, one or more of the administrative components may be configured for high availability, e.g., in response to availability requirements indicated programmatically by the customer, by setting up an active-passive pair of components run at respective compute instances. For example, an active-passive pair of ECMs may be established in one embodiment at respective VPC compute instances, with respective sets of VNIs attached to each compute instance, enabling the passive ECM to take over the functionality of the active ECM in the event of a failure at the active ECM. TPVE metadata maintained at the VPC may indicate which of the ECMs is currently the active ECM, and/or which is currently the passive ECM. In some embodiments, more than two replicas of a given administrative node may be set up, e.g., in respective geographical regions or availability zones of the VCS for improved fault tolerance.

As indicated earlier, in at least some embodiments, VPCs for overlay networks of one or more TVFs may be configured within a VCS of a cloud provider network. A cloud provider network or cloud computing environment (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS may be implemented at one or more data centers, edge locations and/or extension locations of the provider network in different embodiments. The VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network, including the VCS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which overlay networks of third-party virtualization frameworks may be configured using resources of a cloud-based virtualized computing service as the underlying infrastructure, according to at least some embodiments. As shown, system 100 may include resources and artifacts of a cloud provider network 102 at which a virtualized computing service (VCS) 120 is implemented. VCS 120 may comprise a number of logical entities and associated configuration metadata, including virtual private clouds (VPCs) which in turn comprise compute instances 122, subnets 124, route tables 126, virtual network interfaces (VNIs) 128, logical networking intermediaries 130 such as transit gateways, Internet gateways, network address translation (NAT) gateways, scalable load balancers and the like, as well as route servers 132 configured to create/modify/delete route table entries based on received routing metadata in the depicted embodiment. The logical entities of the VCS may be defined and organized in accordance with a first-party virtualization framework (FVF) 171 in the depicted embodiment. As such, when creating, viewing properties of, or modifying logical constructs within the VCS, terminology and interfaces (such as FVF programmatic interfaces 181) specified in the FVF may be used.

The logical components of a VCS may be built on a physical or substrate network 104 of the cloud provider network 102 in the depicted embodiment. The substrate may include a host fleet 106, comprising hardware servers that can be used to run various components of the VCS. Some of the hosts of the fleet may be designated as virtualization hosts (VHs) on which virtualization management components (VMCs) of the FVF, as well as compute instances 122, may be run. The substrate may also include networking hardware components 108 (such as cables, physical switches, etc.) and a set of configuration managers and metadata 110 in the depicted embodiment. The VPCs 121 may be considered overlay networks with respect to the substrate network. The substrate can be considered a network fabric containing the physical hardware that runs the services of the provider network, and can include networking devices such as routers, switches, network address translators (NATs), and so on, as well as the physical connections among the devices. The substrate may be logically isolated from the rest of the cloud provider network. For example, it may not be possible to route from a substrate network address to an address in a production network that runs services of the cloud provider, or to a customer network that hosts customer resources.

In addition to the logical constructs of the VCS shown in FIG. 1, other logical constructs such as block store volumes, data objects such as snapshots and machine images, file storage, databases and the like can also be implemented on the substrate. In at least some embodiments, VCS hypervisors or other devices or processes on the substrate network may use VCS encapsulation protocol technology to encapsulate and route network packets (e.g., client applications' IP packets) over the network substrate between client compute instances on different hosts within the provider network. The encapsulation protocol technology may be used on the network substrate to route encapsulation packets (also referred to as network substrate packets) between endpoints on the network substrate via a first category of overlay network paths or routes. The encapsulation protocol technology may be viewed as providing a virtual network topology overlaid on the network substrate. As such, network packets can be routed along the substrate network according to constructs in the first category of overlay network (e.g., VPCs, security settings such as groups and the like). A mapping service can coordinate the encapsulation and routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as respective compute instances on the host. A hypervisor, or virtual machine monitor, on a host allocates the host's hardware resources amongst various compute instances on the host and monitor their execution. Each compute instance may be provided with or assigned one or more IP addresses (e.g., addresses chosen by the client on whose behalf a VPC is set up) in the VPC-level overlay network, and the virtual machine monitor on a host may be aware of the IP addresses of the compute instances on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be viewed as providing a first level of virtual network topology overlaid on the network substrate. The encapsulation protocol technology may include the mapping service that maintains a mapping directory that maps overlay addresses to substrate IP addresses, which can be accessed by various processes on the cloud provider network for routing packets between endpoints.

In the embodiment depicted in FIG. 1, the VCS may enable the configuration of an additional layer of overlay networks on top of VPCs. The additional layer may comprise logical entities defined in one or more third-party virtualization frameworks (TVFs), such as TVF 172A or TVF 172B. Each such TVF may define a set of constructs, such as virtual machines, virtual switches, VLANs, and the like, which may potentially have different semantics and associated management tools than similar constructs in other TVFs. One or more third-party virtualization environments (TPVEs) may be established in accordance with a selected TVF at the request of a customer of the VCS. For example, TPVE 140A organized according to TVF 172A may be set up for one customer and may comprise TVF logical entities 173A such as virtual machines, TVF-specific administrative servers or nodes, TVF-specific VLAN layouts, and so on. Similarly, TPVE 140B may be organized according to TVF 172B, at the request of the same customer or a different customer, and may have a different set of TVF logical entities 173B. As such, while the VPCs may be considered overlay networks with respect to the substrate network (with the substrate being the underlay network or underlying infrastructure for the VPCs), the TPVEs may be considered overlay networks with respect to the VPCs (with the VPCs being the underlay networks for the TPVEs).

One or more configuration managers of the provider network may be responsible for providing easy-to-use tools (e.g., TVF-specific APIs and/or TVF-agnostic APIs) to enable VCS customers to set up their TPVEs using VPC and VCS technologies as building blocks. For example, various administrative nodes of a TPVE, such as an external connectivity manager (ECM) or a configuration controller of the TPVE (which may be responsible for handling configuration-related APIs of the TVFs, such as requests to launch TVF VMs) may be launched as processes running on respective compute instances in some embodiments. In some embodiments, the VCS may support several categories or classes of compute instances; some classes of instances may be used to run administrative components of the TPVE, while other classes of instances may be used to run TPVE VMs. In one embodiment, "bare-metal" instances may be used to run TPVE hypervisors and VMs, as these types of instances may offer direct access to CPUs and memory of the underlying hardware servers and thereby minimize overhead associated with running the TPVE VMs. For network connectivity of the TPVE VMs, depending on the needs of the TPVE applications, a set of subnets may be configured within the VPC, and encapsulation protocol tunnels (using an encapsulation protocol of the TVF, which may differ from an encapsulation protocol of the FVF) may be set up using VPC VNIs between the TPVE VMs and TPVE connectivity intermediaries such as ECMs. Examples of the use of VPC constructs to support TPVE networking requirements are provided below. Route servers 132 may be set up to obtain dynamic routing information (e.g., IP addresses newly assigned to TPVE VMs within various logical network segments of the TPVE) of the TPVE, and modify routing tables based on the routing information such that packets of the overlay network can be sent to/from the appropriate VPC compute instances. Logical networking intermediaries 130 such as various types of VPC gateways, which typically perform network address translations with respect to VPC compute instance IP addresses, may be programmed to avoid performing network address translations when dealing with some types of TPVE IP addresses in some embodiments.

Once the VPC infrastructure components have been set up appropriately for a given TPVE, further interactions between customers or users of the TPVEs and the logical entities within the TPVEs may take place via TVF programmatic interfaces in the depicted embodiment. For example, TVF 172A programmatic interfaces 182A may be used to interact with TPVE 140A, while TVF 172B programmatic interfaces 182B may be used to interact with TPVE 140B. Consider a scenario in which a command "CreateClassA-VirtualMachine" is defined in TVF 172A for the establishment of a virtual machine of a particular class (Class A) according to TVF 172A, while a different command "LaunchType1VM" is defined in TVF 172B for establishment of virtual machines of a particular type (Type1) according to TVF 172B. Before a Class A virtual machine can be launched on behalf of a customer of TPVE 140A, an API handler responsible for responding to CreateClassAVirtualMachine requests may be launched at a VCS compute instance as part of the setup of TPVE 140A, and a hypervisor of TVF 172A may be run at another VCS compute instance. Then, a CreateClassAVirtualMachine request may be submitted to the API handler via TVF 172A programmatic interfaces 182A (e.g., APIs, web-based consoles, command-line tools, or graphical user interfaces) by a customer of TPVE 140A, and the API handler may send the request to launch the Class A virtual machine to the hypervisor of TVF 172A via pathways configured using subnets and VNIs of the VPC at which TPVE 140A is established. The Class A virtual machine of TVF 172A may then be run at the host at which the hypervisor runs and communicate with other entities using pathways also configured via VPC subnets and VNIs. Similar operations may be performed to create and use virtual machines of Type 1, also using VPC technologies under the covers.

Figure 2:
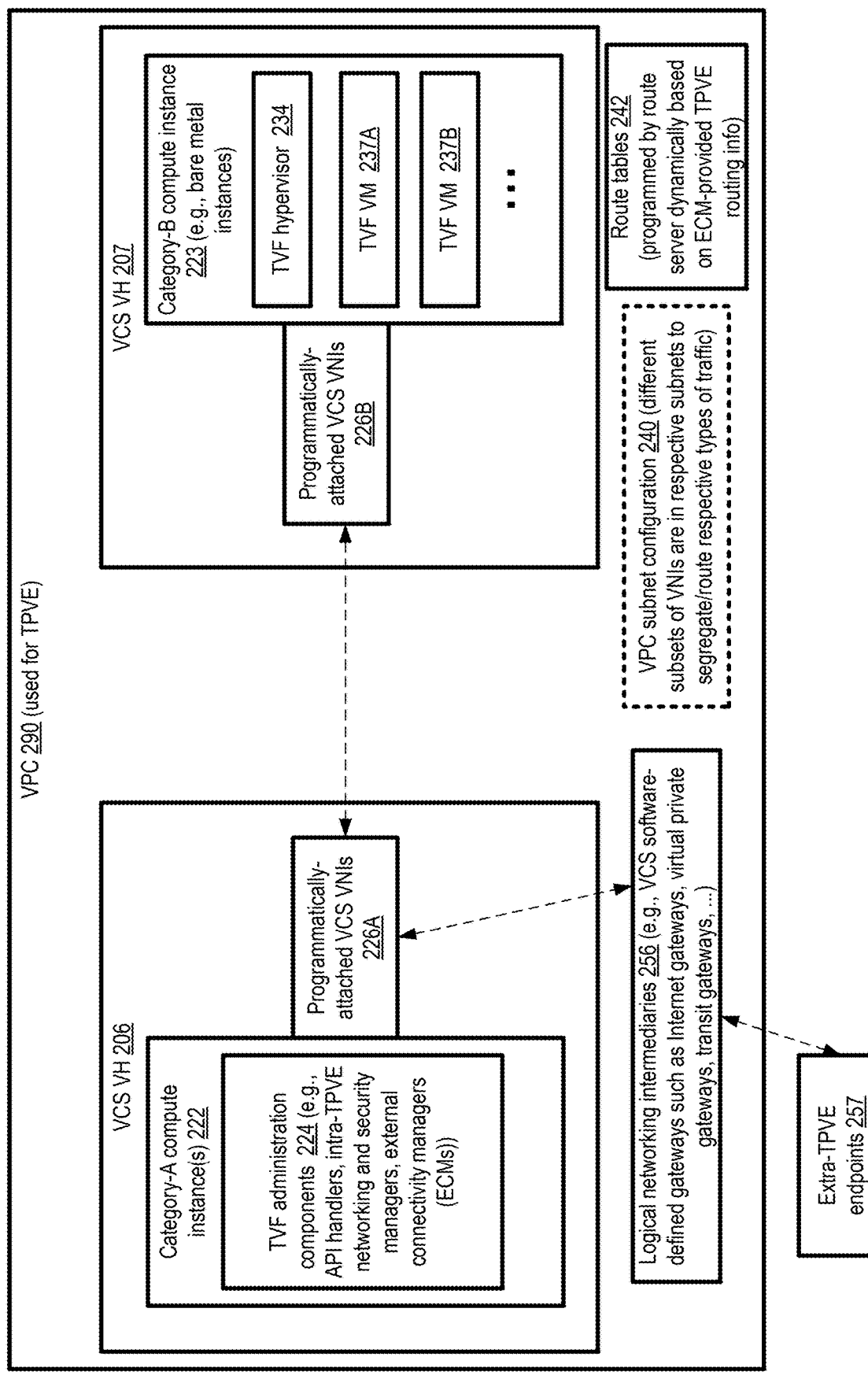
FIG. 2 illustrates an overview of an example use of programmatically attached virtual network interfaces, compute instances and subnets of a virtual private cloud to implement an overlay network, according to at least some embodiments.

FIG. 2 illustrates an overview of an example use of programmatically attached virtual network interfaces, compute instances and subnets of a virtual private cloud to implement an overlay network, according to at least some embodiments. Within a VPC 290 of a VCS similar in features and functionality to VCS 120 of FIG. 1, some number of compute instances may be selected to run administrative components and virtual machines of a TPVE in the depicted embodiment. The VCS may enable customers to acquire compute instances of several categories, such as Category-A compute instances 222 and Category-B compute instances 223. The categories may differ from one another in characteristics such as compute capacity, memory capacity, storage capacity and the like. In at least some embodiments, a category referred to as bare-metal instances may be provided to those VCS customers who wish to run programs (e.g., the customer's selected operating systems or hypervisors) that can directly access the CPUs and memory (as well as one or more other categories hardware devices) of the underlying hardware hosts such as VCS VH 207, without having to go through a VCS intermediary such as a VCS-supplied hypervisor.

One or more Category-A compute instances 222, run on VCS virtualization hosts (VHs) 206 may be used to run TVF administration components 224 in the depicted embodiment. These administration components may include, for example, an administration controller comprising an API handler, intra-TPVE networking and security managers (e.g., administrative components that enforce firewall-like rules on network security), external connectivity managers (ECMs) and the like. One or more VCS VNIs 226A may be programmatically attached to the administration-oriented compute instances 222.

One or more Category-B compute instances 223 run at VCS VHs 207 may be used to run TVF hypervisors 234, as well as a set of TVF VMs such as 237A or 237B launched locally by the hypervisor in the depicted embodiment. A set of VCS VNIs 226B may be programmatically attached to the Category-B compute instance, and used to transmit packets between (a) the hypervisor 234 and the TVF administration components 224 and (b) the TVF VMs and entities outside the Category-B compute instance 223. For example, in some embodiments, an ECM may be used as an intermediary for at least some of the traffic from a TVF VM to/from entities outside the instance 223. Encapsulation protocol tunnels may be set up using the VNIs as endpoints to transfer the data from the TVF VMs to the ECM and from the ECM to the TVF VMs. In some embodiments, a special type of VNI called a multiplexor or trunked VNI, with corresponding multiplexed or branch VNIs in several subnets may be used for the encapsulation protocol, A set of logical networking intermediaries 256 such as VCS software-defined gateways (Internet gateways, transit gateways for inter-VPC traffic, virtual private gateways for connectivity to on-premise networks, network address translation gateways, etc.) may be configured for traffic between the VMs (via an ECM) to endpoints in the public Internet, endpoints in customer premises, and/or endpoints in other VCS VPCs in some embodiments. Such endpoints may be referred to as Extra-TPVE endpoints 257. One or more of the gateways may be programmed to perform custom operations for TVF VMs—e.g., the gateways may be configured to not perform the types of network address translations they normally perform for traffic of VPC compute instances.

The VPC subnet configuration 240 may be set up for the TPVE's traffic patterns in the depicted embodiment. Different subsets of VPC VNIs may be assigned addresses in respective subnets to emulate respective VLANs of the TPVE, such that traffic within the distinct subnets can be segregated and routed independently. Route tables 242 of the VPC may be programmed by a route server dynamically based on ECM-provided TPVE-level routing information in various embodiments. The routing changes may be used at the VPC level to send packets from the TVF VMs to extra-TPVE endpoints, for example, and to send packets from extra-TPVE endpoints to the TVF VMs.

Figure 3:
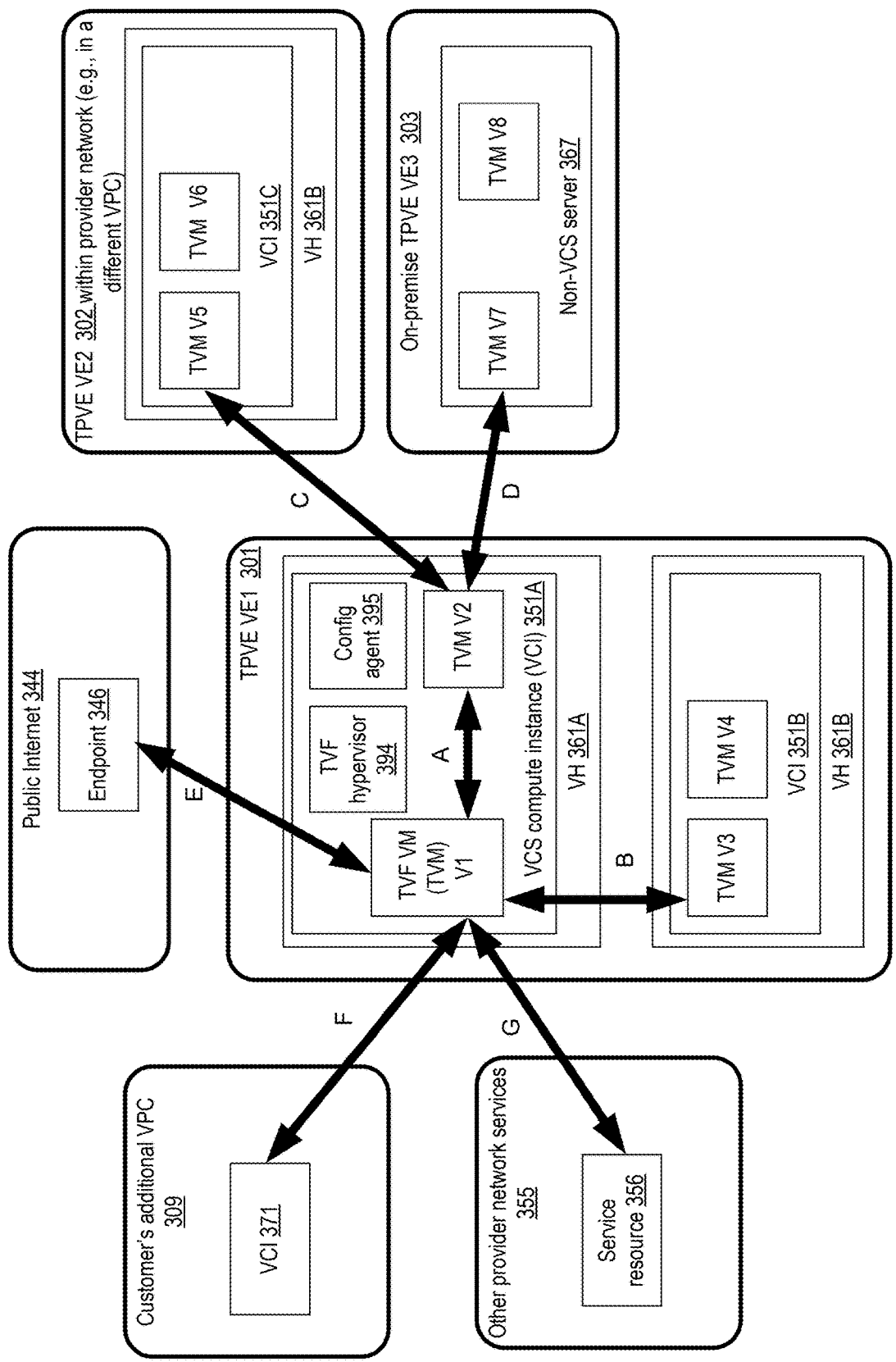
FIG. 3 illustrates example categories of application-level data traffic of virtual machines of an overlay network, according to at least some embodiments.

FIG. 3 illustrates example categories of application-level data traffic of virtual machines of an overlay network, according to at least some embodiments. In the scenario shown in FIG. 3, two different TPVEs implemented according to a single TVF have been set up: TPVE VE1 301 and TPVE VE2 302. TPVE VE1 301 comprises a set of TVF VMs (TVMs) including V1 and V2, a TVF hypervisor 394 and a VCS configuration agent 395 run within a VCS compute instance (VCI) 351A on a virtualization host (VH) 361A. The VCS configuration agent, also referred to as an overlay hypervisor configuration agent, may be configured to modify the configuration of the TVF hypervisor and/or the VCI 351A based on host configuration templates formatted according to the TVF and submitted to the VCS by the customer on whose behalf the TPVE is set up. Such host configuration templates, also referred to as host configuration descriptors, overlay network descriptors or simply as configuration templates, may indicate permitted network traffic patterns (e.g., expressed using VLANs) of the TVMs, and may be used to set up internal data structures of the hypervisor (such as virtual switches) to enable those traffic patterns, and/or to set up the appropriate VPC constructs (e.g., programmatically attached VNIs) to support those traffic patterns in some embodiments. TPVE VE1 may include another VCI 351B on another VH 361B; VCI 351B may include its own set of TVMs such as TVN V3 and TVM V4.

Application or data plane traffic of category A may flow between TVMs on the same VCI. Traffic of category B may flow between TVMs on different VCIs (e.g., VCI 351A and VCI 351B) within the same TPVE. Category C traffic may flow between TVMs in different TPVEs (e.g., between TVM V2 and TVM V5 or V6 on VCI 351C at VH 361B). In some embodiments, individual ones of the TPVEs may be implemented within respective VPCs, so category C traffic may have to be transmitted across VPC boundaries.

Some applications within TPVE VE1 may need to communicate with TVMs that are run at TPVEs at customer premises, e.g., comprising TVMs V7 and V8 at a non-VCS server 367 of an on-premise TPVE VE3 303. Traffic category D may comprise packets sent from TPVE VE1 (e.g., from TVM V2) to TVM V7 and in the reverse direction. Traffic category E may comprise packets sent in either direction between TVF VMs in TPVE VE1 and endpoints 346 of the public Internet 344.

The customer on whose behalf the TPVE VEL is set up may also have other VPCs configured at the VCS (i.e., VPCs that are not used for TPVEs), such as customer's additional VPC 309 comprising a VC1 371. Traffic between TVMs such as V1 and VCI 371 is labeled category F traffic in the depicted example. The TVMs may also need to communicate with service resources 356 of other provider network services 355 (non-VCS services such as storage services, database services, machine learning services and the like). Such traffic is labeled traffic category G.

Traffic of category A may be handled by the TVF hypervisor itself in the depicted embodiment. The hypervisor may intercept a packet generated at TVF V1 for TVF V2, determine that the destination is on the same VCI, and simply transfer the packet via a local data structure to the destination V2. Of the different kinds of traffic shown in FIG. 3, only category A traffic may be handled without using VCS networking paths; for all other categories, packets have to be sent from one VCS host to another, which means that the substrate network of the VCS has to be used. The VCS may therefore be required to provide efficient communication channels for categories B, C, D, E, F and G. This may be done using various combinations of VPC subnets, VNIs, encapsulation protocol tunnels, logical networking intermediaries such as VCS gateways, routing servers, VPC route tables, gateway route tables, and the like, as described below in further detail. In at least one embodiment, packets of categories B, C, D, E, F and G may all be processed/transferred with the help of one or more ECMs of the TPVE.

Figure 4:
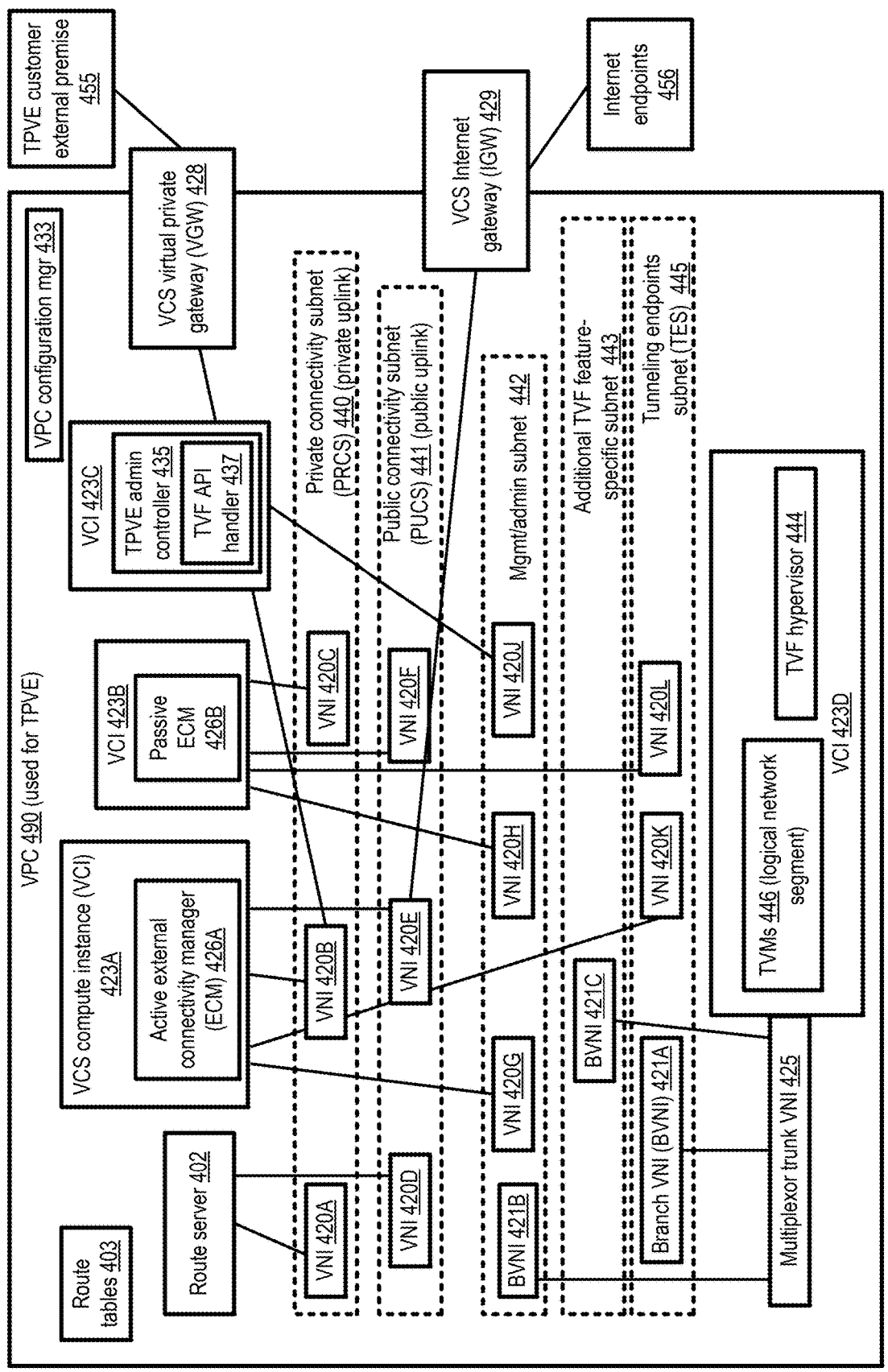
FIG. 4 illustrates an example collection of virtual private cloud subnets which may be set up for different kinds of traffic of an overlay network, according to at least some embodiments.

FIG. 4 illustrates an example collection of virtual private cloud subnets which may be set up for different kinds of traffic of an overlay network, according to at least some embodiments. In the depicted scenario, in which a VPC 490 of a VCS similar in features and functionality to VCS 120 of FIG. 1 is used as infrastructure for an overlay TPVE corresponding to a particular TVF, at least five subnets may be set up within the VPC. These include a private connectivity subnet (PRCS) 440 (also referred to as a private uplink subnet), a public connectivity subnet (PUCS) 441 (also referred to as a public uplink subnet), a management or administrative subnet 442, a tunneling endpoints subnet (TES) 445 and an additional TVF feature-specific subnet 443. The subnet layout shown in FIG. 4 may correspond to a VLAN layout of the TPVE in the depicted embodiment—e.g., the customer on whose behalf the TPVE is set up may organize the TPVE as a collection of VLANs in accordance with the TVF of the TPVE, and the VLANs may be mapped to one or more subnets in the VPC context. The number and arrangement of subnets within the VPC may be dependent on the TVF whose overlay network is to be configured at the VPC—e.g., if an overlay network corresponding to a different TVF were to be set up at VPC 490, a different collection of subnets may be established.

Administrative components of the TPVE may be launched as respective programs running on VCS compute instances (VCIs) in the depicted embodiment, e.g., based on input provided by the customer to a distributed VPC configuration manager 433 using tools or APIs. For example, a pair of ECMs configured in active-passive mode for high availability may be launched at VCIs, with active EVM 426A run on VCI 423A and passive ECM 426B run on a different VCI 423B. Both the active and passive ECMs may have a similar set of VNIs attached to their parent VCIs in various embodiments, such that in the event of a failure of the active ECM, the passive ECM can very quickly take over the functionality of the active ECM. For example, the set of VNIs programmatically attached to the VCI 423A of the active ECM may include VNI 420B in the PRCS, VNI 420E in the PUCS, VNI 420G in the management subnet 442, and VNI 420K in the TES. Similarly, another set of VNIs programmatically attached to the passive ECM's VCI 423B may include VNI 420C in the PRCS, VNI 420F in the PUCS, VNI 420H in the management subnet 442, and VNI 420L in the TES.

A TPVE administration controller 435 may be run at a third VCI 423C in the depicted embodiment. The administration controller may include a TVF API handler 437 which receives and responds to configuration-related commands of the TVF. Other administrative nodes or components of the TPVE (such as an intra-TPVE network security controller) may be run on respective VCIs in some embodiments. Multiple replicas of individual ones of the administrative nodes other than the ECM may also be run in active-passive mode, or more generally in redundancy groups with one current active node and one or more non-active nodes for each type of administrative node. The TPVE administration controller 435 may have a VNI 420J programmatically attached to its parent VCI 423C in some embodiments.

Individual ones of the subnets may have associated route tables 403 created by the VPC configuration manager 433 in various embodiments. In at least one embodiment, one or more route tables may be established for respective logical networking intermediaries of the VCS, such as a VCS private virtual gateway (VGW) 428, a VCS Internet gateway (IGW) 429, VCS transit gateways (not shown in FIG. 4), etc. One or more route servers 402 may be configured within the VPC by the VPC configuration manager for exchanging routing metadata pertaining to the TPVE (e.g., IP addresses assigned to the TVMs) with routing protocol engines run at the ECM(s) of the TPVE. The route servers may for example modify (by adding or changing contents of entries) route tables 403 such that traffic of the overlay network can be routed correctly using the VPC or underlay network components. In at least some embodiments, as discussed below in further detail, the route servers may use a variant or version of BGP or similar protocols for exchanging the route information. Route server 402 may have a pair of VNIs programmatically attached (e.g., to a VCI at which the route server software runs): VNI 420A of the PRCS for communication related to private addresses (addresses that are not publicly advertised), as well as VNI 420D of the PUCS for communication related to publicly-advertised addresses.

One or more VCIs such as VCI 423D may be designated to host respective TVF hypervisors 444 and/or TVMs 446 that are to be used for running the customer's applications in the depicted embodiment. In the depicted embodiment, multiple TVMs belonging to one or more logical network segments of the overlay network may be run at the VCI 423D. As indicated earlier, in at least some embodiments, VCI 423D may have a multiplexor trunk VNI 425 programmatically attached. The multiplexor trunk VNI may in some embodiments use up only a single network interface slot within the hypervisor 444 but may concurrently allow connectivity from the VCI 423D via a group of multiplexed or branch VNIs to entities in various VPC subnets. The branch VNIs may for example include BVNI 421A in the TES, BVNI 421C on additional TVF feature-specific subnet 443, and BVNI 421B in the management subnet. In some scenarios, the TVF may support connectivity for utilizing one or more of its features via additional subnets 443—for example, one such subnet may be used to enable access from the TVMs 446 to storage devices at storage servers supported by the TVF, or to support migration of TVMs from one VCI to another.

The management subnet 442 may be used for messages used to configure and/or monitor various TPVE components, in accordance with the corresponding TVF. For example, if and when the TVF API handler receives a programmatic request (formatted according to a TVF API) to launch a new TVM at VCI 423D, a corresponding internal command may be sent from the TPVE admin controller via VNI 420J and BVNI 521B to the TVF hypervisor, and the TVF hypervisor may then start up the requested TVM at VCI 423D. The management subnet may also be used by the different administrative nodes to communicate with one another—for example, the TPVE admin controller 435 may communicate with the ECMs via VNIs 420J, VNI 420G and/or VNI 420H if needed. The TES 445 may be used for encapsulated communications between the TVMs 446 and the ECM(s), enabling traffic to flow between the TVMs and entities external to the VCI 423D, such as Internet endpoints 456 and TPVE customer external endpoints 455 or public Internet endpoints 456. For public Internet traffic, the ECM may route packets that originated at the TVMs via VNIs in the PUCS and a VCS Internet gateway (IGW) 429. VNI 420E may be programmatically attached to or associated with the IGW as well as the active ECM in some implementations for transmission of such traffic. For private traffic (e.g., traffic to endpoints with IP addresses that are not advertised on the public Internet, such as endpoints at customer premises or within other VPCs of the customer), the ECM may route packets that originated at the TVMs via VNIs in the PRCS and/or a VCS private virtual gateway (VGW) 428. VGW 428 may also be programmatically attached or associated with VNI 420B.

Figure 5:
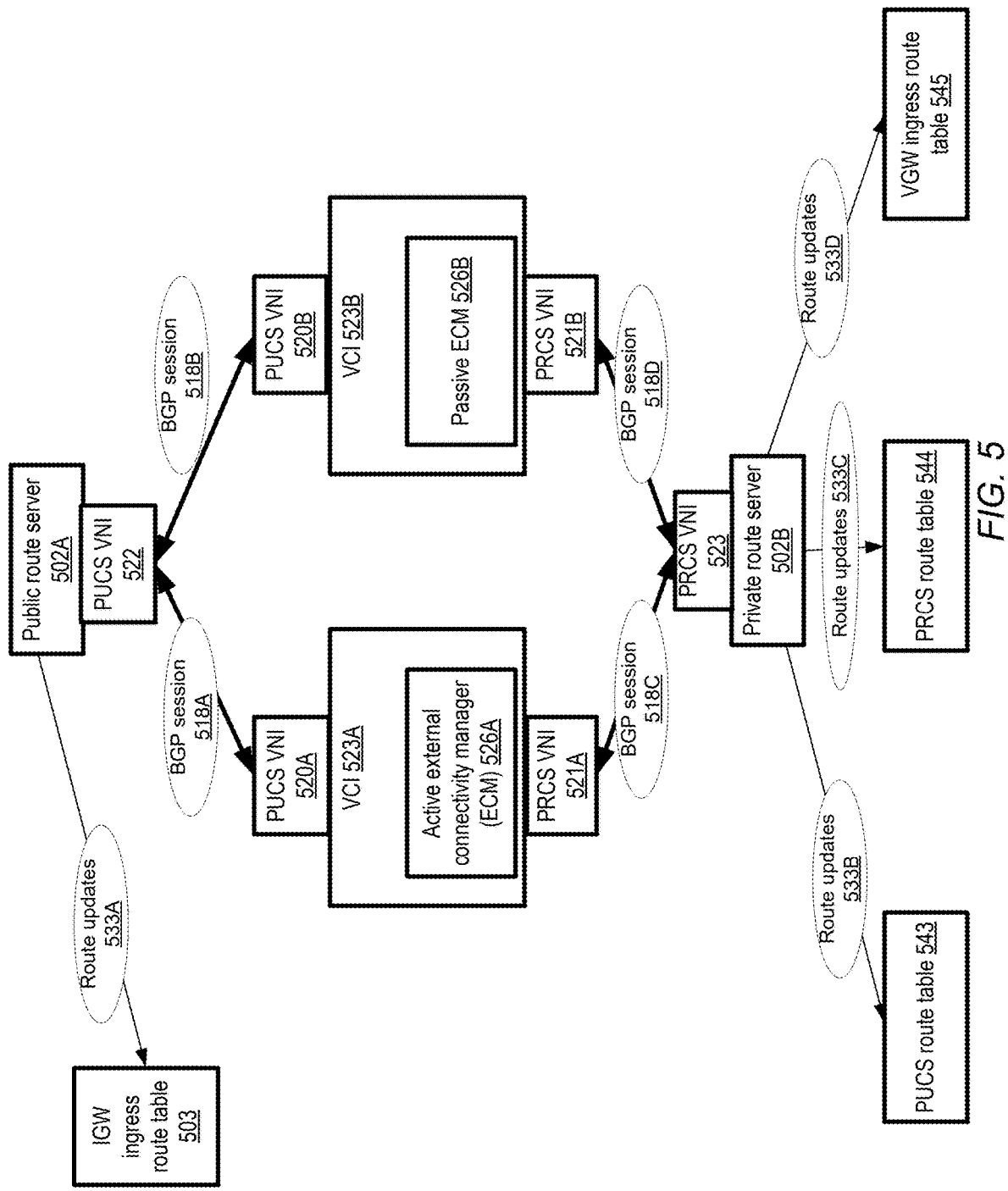
FIG. 5 illustrates an example configuration of route servers for obtaining routing information dynamically from an overlay network and modifying route tables of a corresponding underlay network, according to at least some embodiments.

FIG. 5 illustrates an example configuration of route servers for obtaining routing information dynamically from an overlay network and modifying route tables of a corresponding underlay network, according to at least some embodiments. A pair of ECMs may be set up for high availability with respect to management of external connectivity of a TPVE in the depicted embodiment: an active ECM 526A running on a VCS compute instance (VCI) 523A, and a passive ECM 526B running on another VCI 523B. A pair of route servers may also be set up: a public route server 502A for handling routing information pertaining to publicly advertised addresses associated with the TPVE traffic, and a private route server 502B for handling routing information pertaining to private addresses (i.e., addresses that are not publicly advertised outside the VCS or customer premises) associated with TPVE traffic. In some embodiments individual ones of the route servers may also be run on respective VCIs. In at least one embodiment, a single route server may be used at a VPC used for a TPVE instead of separate private and public route servers.

The ECMs and the route servers may each comprise a respective BGP processing engine in the depicted embodiment, capable of exchanging information using one or more variants of BGP. VCI 523A may have PUCS (public connectivity subnet) VNI 520A and PRCS (private connectivity subnet) VNI 521A programmatically attached for BGP session traffic. VCI 523B may have PUCS VNI 520B and PRCS VNI 521B programmatically attached for BGP session traffic. Public route server 502A may have PUCS VNI 522 attached. Private route server 502B may have PRCS VNI 523 programmatically attached.

Respective BGP sessions 518A and 518B may be established (e.g., for higher availability than if only one BGP session were set up) from public route server 502A, e.g., based on commands from a configuration manager of the VPC, to the active ECM and the passive ECM in the depicted embodiment. Similarly, respective BGP sessions 518C and 518D may be established from private route server 502B to the active ECM and the passive ECM respectively. The ECMs may provide routing metadata pertaining to the TPVE VMs of various logical network segments (e.g., the IP addresses or ranges assigned to the TPVE VMs by the customer on whose behalf the TPVE is set up) via the BGP sessions to the route servers. Metadata pertaining to publicly advertised addresses, obtained via BGP sessions 518A or 518B, may be used by public route server 502A to apply route updates 533A to, for example, an IGW (Internet gateway) ingress route table in various embodiments. Metadata pertaining to private addresses, obtained via BGP sessions 518C or 518D, may be used by private route server 502B to apply route updates to any of several types of route tables, such as route updates 533B to PUCS route table 543, route updates 533C to PRCS route table 544, or route updates 533D to VGW (virtual private gateway) ingress route table 545 in the depicted embodiment. In effect, the route servers may consume routing information pertaining to overlay network VMs (whose network configuration details may otherwise not be known at the underlay or VPC level) and apply corresponding changes to the underlay route tables to ensure that traffic intended to be sent to or received from the overlay network is directed to the correct underlay components. Routing information pertaining to VPC entities (such as other VCIs of the customer within the same VPC which is being used for the TPVE, or within other VPCs) may be provided to the ECMs in some embodiments by the route servers, thereby informing the ECMs how to direct traffic to those entities from the TPVE VMs. In some embodiments, dynamic routing information exchange protocols other than BGP versions or variants may be used.

Figure 6:
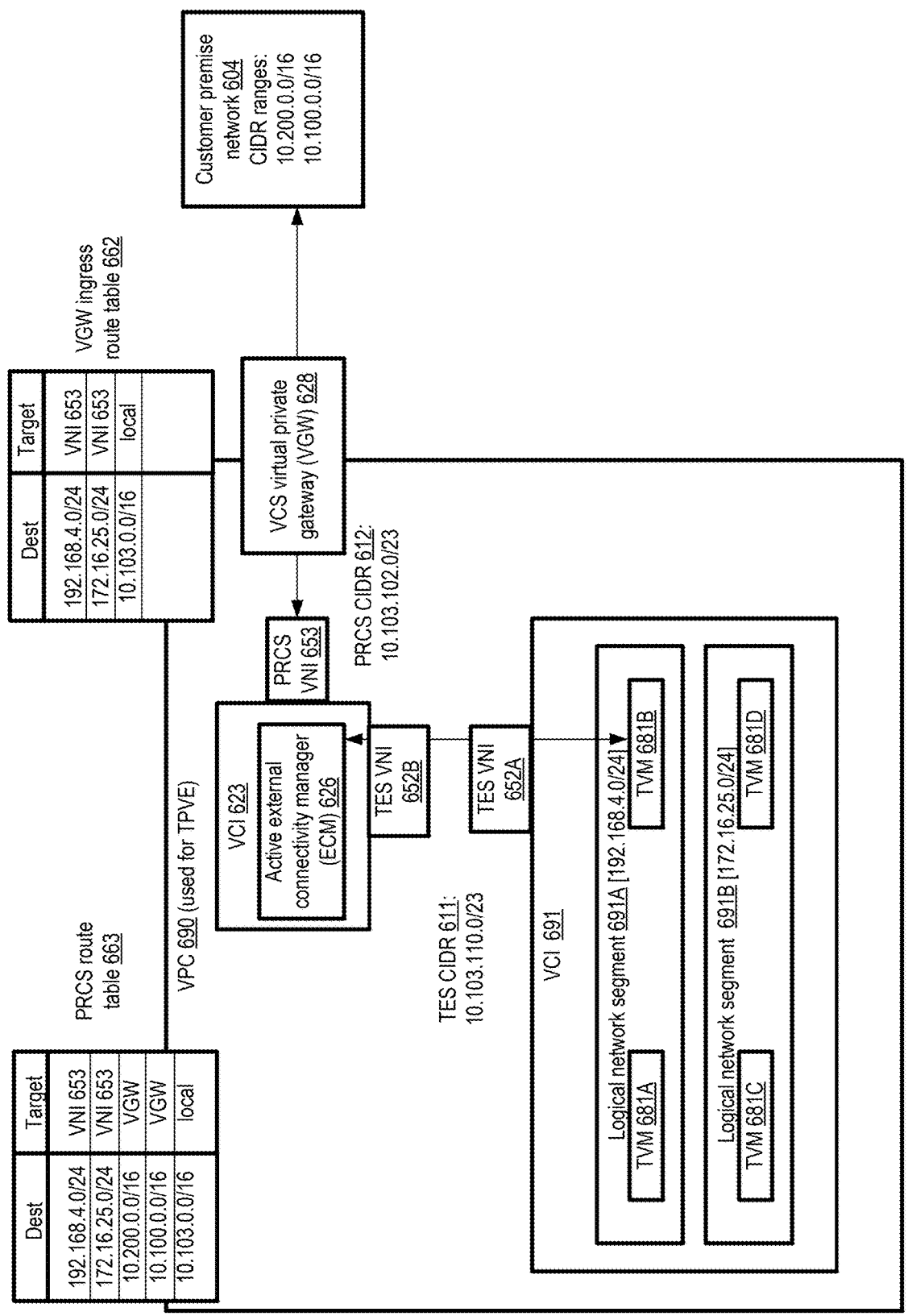
FIG. 6 illustrates an example pathway for traffic between a virtual machine of an overlay network and other resources at a customer's premise, according to at least some embodiments.

FIG. 6 illustrates an example pathway for traffic between a virtual machine of an overlay network and other resources at a customer's premise, according to at least some embodiments. In the depicted embodiment, a customer of the VCS, on whose behalf an overlay network comprising a TPVE is set up, has configured TPVE VMs (TVMs) within two logical network segments at a particular VCI 691 of a VPC 690. TVMs within logical network segment 691A, such as TVM 681A and TVM 681B, are assigned network addresses from a customer selected CIDR range 192.168.4.0/24. TVMs within logical network segment 691B, such as TVM 681C and TVM 681D, are assigned network addresses from a different customer selected CIDR range 172.16.25.0/24. Note that the addresses and address ranges shown on FIG. 6 and other figures are provided simply as illustrative examples, and the techniques introduced herein may be applied with equal success regardless of any particular address ranges or any particular versions of a networking protocol such as IPv4 (Internet Protocol version 4) or IPv6 (IP version 6).

Resources at a customer premise network 604 of the customer are assigned addresses from CIDR ranges (also selected by the customer) 10.200.0.0/16 and 10.100.0.0/16 in the depicted example scenario. An encapsulation protocol tunnel (e.g., a Geneve tunnel) has been established between the VCI 691 and VCI 623 at which an active ECM 626 of the TPVE runs. The tunnel may be established using TES (tunneling endpoints subnet) VNI 652A programmatically attached to VCI 691, and TES VNI 652B programmatically attached to VCI 623. The TES itself may have a CIDR range 611 10.103.110.0/23 assigned to it.

A PRCS (private connectivity subnet) VNI 653 may also be programmatically attached to VCI 623 in the depicted embodiment. The PRCS may be assigned to CIDR address range 612 10.103.102.0/23. Traffic flows between the TVMs of VCI 691 and the customer premise network 604 may be sent via VCS virtual private gateway VGW 628 in the depicted embodiment. The VGW may also be programmatically attached or associated with the PRCS VNI in some embodiments.

A pair of route tables, at least some of whose entries may have been created by route servers based on routing metadata provided by the active ECM 626, may be used for the traffic between the customer premise and the TPVE: the PRCS route table 663 and the VGW ingress route table 662. The first entry shown in the PRCS route table 663 may indicate that for traffic intended for TVM addresses within logical network segment 691A (192.168.4.0/24), the target should be VNI 653. The second entry of route table shows that for traffic intended for TVM addresses within logical network segment 691B, the target should also be VNI 653. The third and fourth entries indicate that for addresses in the customer premise network, the target should be the VGW.

The fifth entry indicates that for addresses within the subnets of the VPC (such as the PRCS and the TES), the local target should be used. The first two entries shown in the VGW ingress route table 662 also indicate that for traffic directed to the TVMs in logical network segments 691A and 691B, the VNI 653 should be used as the target. The third entry in the VGW ingress route table also indicates that the local target should be selected for addresses within the VPC subnets.

Outbound packets from the TVMs (with destinations in the customer premise network) may first be sent via the encapsulation tunnel to the active ECM in the depicted embodiment. From the active ECM, the packets may be sent, based on the PRCS route table entries, to the VGW. The VGW may then transfer the outbound packets to a router at the customer premise network, e.g., via a private virtual interface (Private VIF) configured for a direct dedicated link (also referred to as Direct Connect) between the VCS and the customer premise in some embodiments. Inbound traffic directed to the TVMs from the customer premise may be received at the VGW and routed to ENI 653B. The active ECM may then determine that the traffic is to be routed via the encapsulation tunnel to VCI 691, where a hypervisor of the TPVE (not shown in FIG. 6) may route the traffic to the intended destination TVM.

Figure 7:
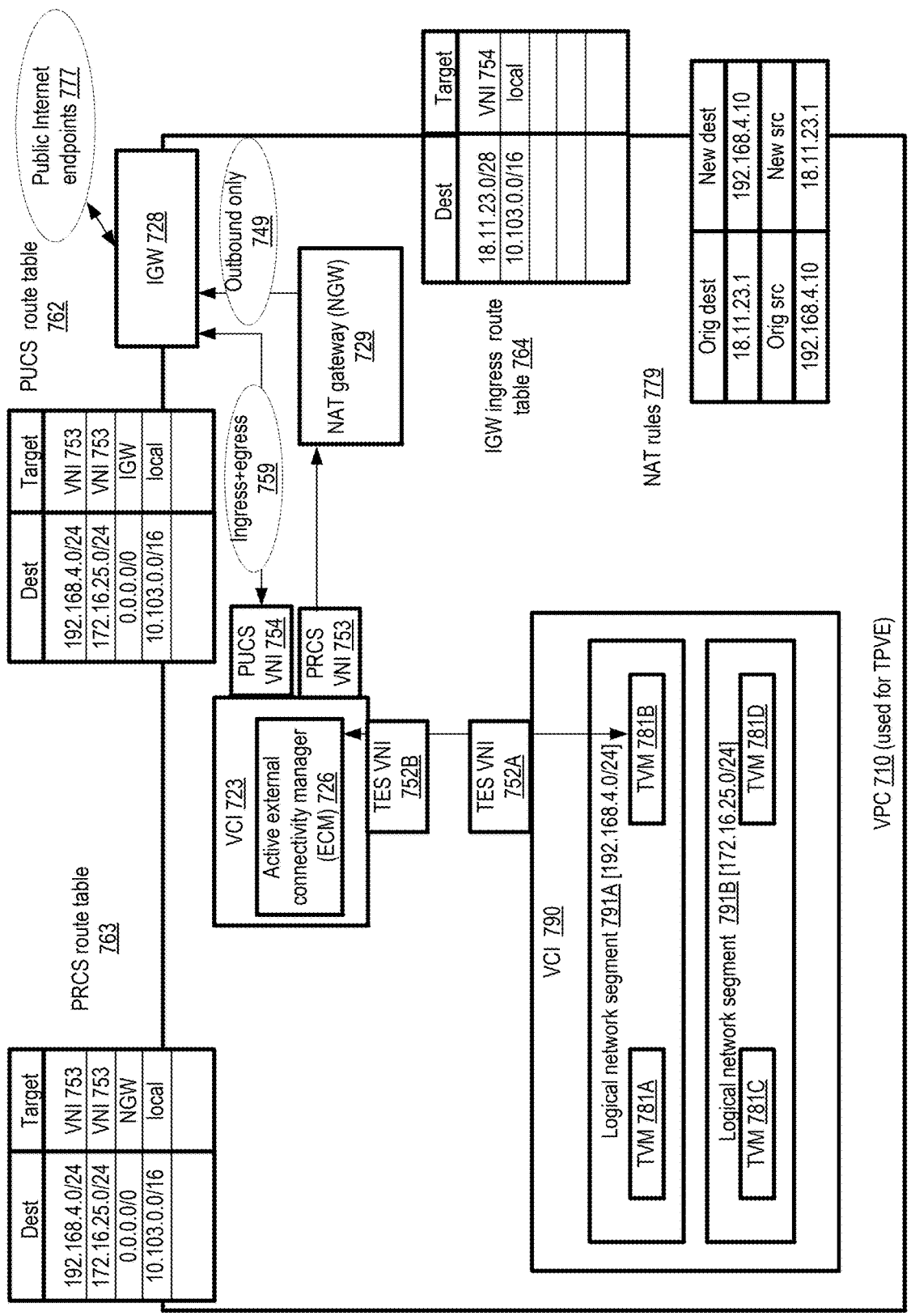
FIG. 7 illustrates example pathways for traffic between a virtual machine of an overlay network and resources in the public Internet, according to at least some embodiments.

FIG. 7 illustrates example pathways for traffic between a virtual machine of an overlay network and resources in the public Internet, according to at least some embodiments. A pair of logical network segments 791A and 791B with respective CIDR address ranges 192.168.4.0/24 and 172.16.25.0/24 may have been set up at VCI 790 of VPC 710 by the customer using APIs of the TVF. TVMs 781A and 781B may be assigned network addresses selected from segment 791A, while TVMs 781C and 781D may be assigned network addresses from segment 791B.

In some cases, the customer may wish to enable bi-directional (ingress and egress with respect to the TPVE) access between public Internet endpoints 777 and TVMs of the TPVE, while in other cases, outbound-only or egress-only access (transmission of packets from the TVMs to Internet endpoints, without permitting packets from Internet endpoints to be sent to the TCMs) may be desired. In some embodiments in which both ingress and egress is to be permitted, the customer may obtain a public CIDR address range (e.g., a /28 range or a /23 public IPv4 range or block of addresses that is advertised on the public Internet and accessible from the public Internet) from the VCS for assignment to the TVMs. In the scenario depicted in FIG. 7, the CIDR block 18.11.23.0/28 comprising public IP addresses may be assigned to the TVMs of the VCI 790, and an entry indicating that the target for packets within that block should be directed to VNI 754 may be stored in an IGN ingress route table 764. In at least one embodiment, such an entry may be generated by the route server based on routing metadata received from the active ECM 726 running on VCI 723. For the bi-directional Internet connectivity scenario, the public connectivity subnet (PUCS) route table 762 may include a quad-zero entry (0.0.0.0) indicating the IGW as the target, along with entries specifying VNI 753 as the target for addresses within the logical network segments 791A and 791B, and one entry specifying a local target for destinations in the 10.103.0.0/16 range which is used for the VPC subnets as in the scenario shown in FIG. 6. The active ECM may perform network address translation between the public addresses in 18.11.23.0/28 and the logical network segment addresses of the TVMs in the scenario.

Given the example route table entries illustrated in FIG. 7, in the bi-directional access scenario, the following operations may be performed in some embodiments. A packet generated at an Internet endpoint 777, with a destination address belonging to the public CIDR block 18.11.23.0/28 may be received at the IGW (e.g., via networking components of the VCS), as the IGW may have advertised that block in its route table. The IGW may then route the packet to the VNI 754 of the PUCS (as indicated by the ingress+ agress arrow 759. The active ECM may receive the packet, perform NAT to an address in a logical network segment 791, and send the packet via the encapsulation tunnel (already set up using TES VNI 752B and TES VNI 752A) to the VCI 790, where a TPVE hypervisor may deliver the packet to the intended destination TVM. For outbound packets directed from a TVM to a public Internet endpoint 777, the packet may first be sent via the tunnel to the active ECM. The ECM may perform NAT on the packet, and then send it to the IGW based on the quad-zero entry in the PUCS route table. From the IGW, the packet may be sent on to an Internet router for delivery to the destination.

To support the outbound-only or egress-only scenario, a NAT gateway (NGW) 729 may be set up in the VPC by the configuration manager, and a quad-zero entry with the NGW as the target may be inserted into PRCS route table 763. An ingress routing option may not be required for this use case. When the outbound packet is received at the active ECM via the tunnel from the TVM, the active ECM may send the packet on to the NGW based on the quad-zero entry in the PRCS route table. In accordance with the NAT rules 779, the source address of the packet may be set to one of the public CIDR addresses (e.g., 18.11.23.1), and the packet may be sent to IGW 728 from the NGW as indicated by the outbound-only arrow 749. The IGW may then send the packet to the destination on the public Internet.

Figure 8:
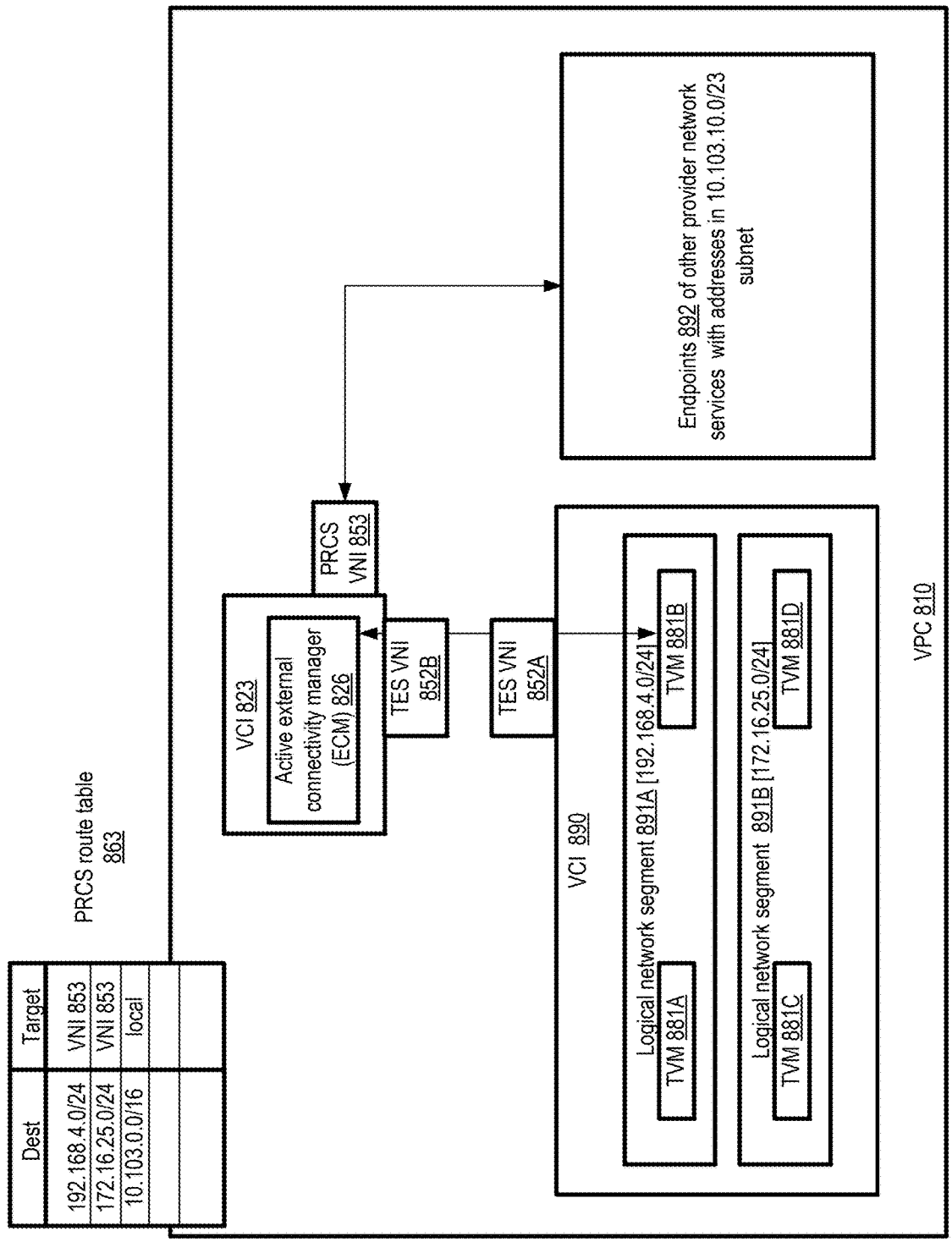
FIG. 8 illustrates example pathways for traffic between a virtual machine of an overlay network implemented on behalf of a customer using a first set of cloud resources and additional sets of cloud resources, according to at least some embodiments.

FIG. 8 illustrates example pathways for traffic between a virtual machine of an overlay network implemented on behalf of a customer using a first set of cloud resources and additional sets of cloud resources, according to at least some embodiments. The overlay network may comprise TVMs 881 (such as TVMs 881A and 881B of logical network segment 891A, as well as TVMs 881C and 881D of logical network segment 891B), launched within a VCI 890 of VPC 810. The additional set of cloud resources may be accessed in the depicted embodiment via a set of endpoints 892 assigned address in a 10.103.10.0/23 CIDR block within the VPC itself. For example, to access a storage service of the cloud provider network via private pathways within the provider network, a first local storage service endpoint may be set up with an address in that CIDR block, and to access a machine learning service of the cloud provider network a second local machine learning service endpoint may be set with another address in that CIDR block.

A packet originating at a TVM 881 and directed to an endpoint 892 may be transmitted via the encapsulation tunnel set up using TES VNIs 852A and 852B to the active ECM 826 running in VCI 823 in the depicted embodiment. From there, in accordance with the PRCS route table 863, the packet may be sent using PRCS VNI 853 to the destination endpoint 892. Packets originating at the service endpoint, with a TVM 881 as a destination, may be directed to the PRCS VNI 853 in accordance with the PRCS route table, and from the ECM 826 to the VCI 890 via the encapsulation protocol tunnel.

In some cases, packets may have to be sent from TVMs within a given VPC 810 to destinations within a different VPC. For example, traffic of categories C and F shown in FIG. 3 may have to be sent from one VPC to another. For such traffic, in some embodiments a transit gateway may be established as a VPC-to-VPC intermediary by a VCS configuration manager, and route table entries indicating the transit gateway as the target may be added to one or more of the VPC route tables. Conceptually, this may be analogous to the addition of entries indicating the VGW as the target, shown in FIG. 6. Other types of traffic patterns than those illustrated in FIG. 3, FIG. 6, FIG. 7 and FIG. 8 may also be supported in some embodiments, with the help of route table entries created by route servers using routing metadata provided by ECMs of the TPVEs involved, and using VCS logical networking intermediaries similar to VGWs, IGWs, NAT gateways and/or transit gateways.

Figure 9:
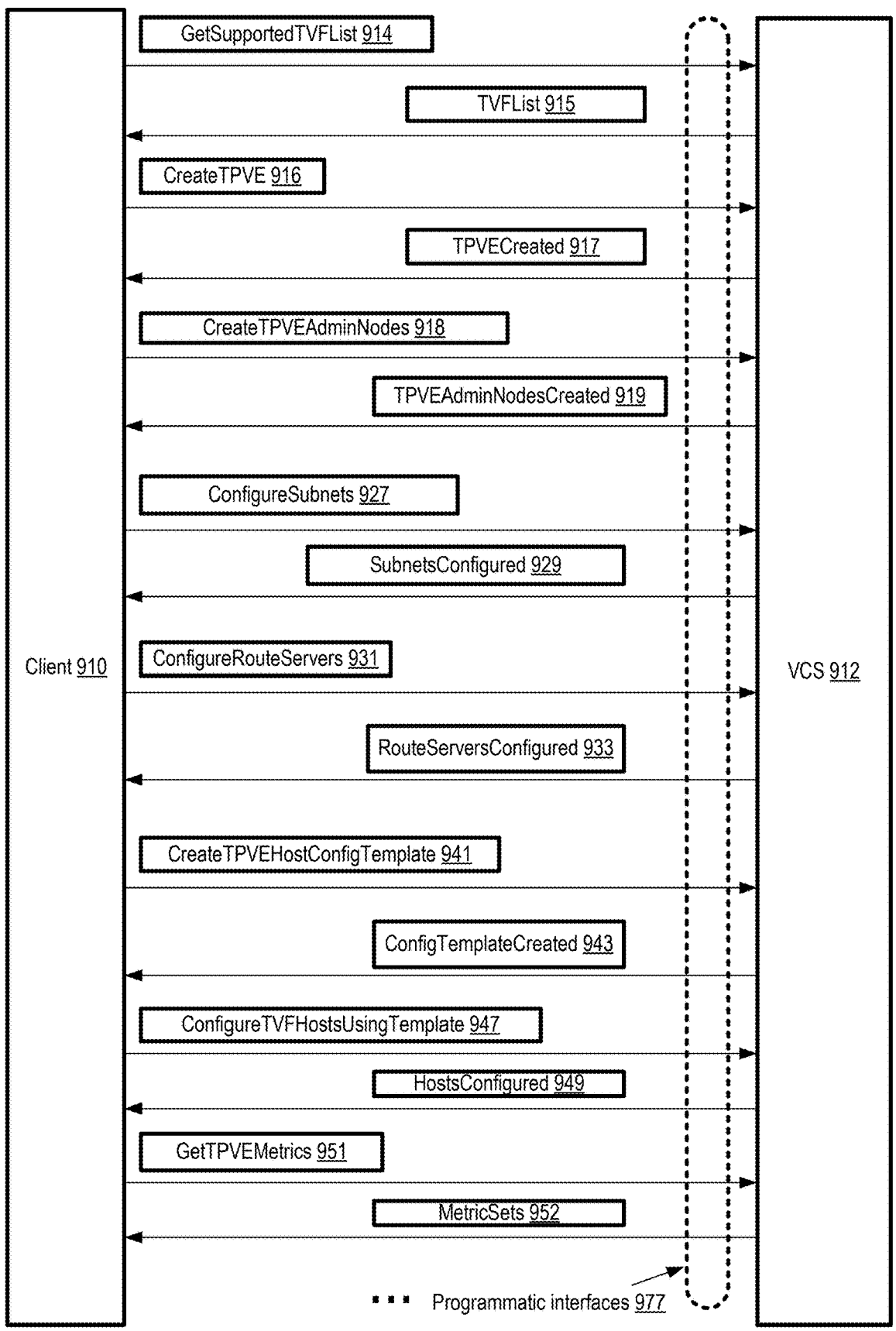
FIG. 9 illustrates example programmatic interactions, pertaining to the configuration of overlay networks using resources of a cloud computing environment as an underlay network, between customers and a virtualized computing service of the cloud computing environment, according to at least some embodiments.

FIG. 9 illustrates example programmatic interactions, pertaining to the configuration of overlay networks using resources of a cloud computing environment as an underlay network, between customers and a virtualized computing service of the cloud computing environment, according to at least some embodiments. A VCS 912, similar in features and functionality to VCS 120 of FIG. 1, may implement a set of programmatic interfaces 977 in the depicted embodiment, such as one or more web-based consoles, command-line tools, graphical user interfaces and/or APIs. Clients 910 (e.g., customers that wish to set up overlay networks of TVFs using VCS resources as underlying infrastructure) may utilize the programmatic interfaces to submit requests and information pertaining to their overlay networks and receive corresponding responses.

As indicated earlier, in at least some embodiments a VCS may support the creation and configuration of TPVEs of several different third-party virtualization frameworks or TVFs. A GetSupportedTVFList request 914 may be submitted by a client via programmatic interfaces 977 to obtain a list of supported TVFs. Individual ones of the TVFs may comprise a respective technology stack with different types of logical constructs and different APIs provided by a respective virtualization products vendor, for example. A list of the TVFs whose TPVEs can be configured using tools and APIs made available by the VCS may be provided to the client via a TVFList message 915.

The client may select a particular TVF and submit a CreateTPVE request 916 to the VCS indicating that a virtualization environment of the chosen TVF is to be established on the client's behalf. Metadata representing a new TPVE may be generated and stored at the VCS, and a TPVECreated response message 917 may be sent to the client in some embodiments. The TPVECreated message may for example include an identifier of the TPVE, which may be included as a parameter in subsequent programmatic requests pertaining to the configuration of the TPVE in some embodiments. In at least one embodiment, the CreateTPVE request may include a VPC identifier (or VPC identifier list) as a parameter, indicating which specific VPC or VPCs of the client are to be used for the TPVE. In one embodiment, if the CreateTPVE request does not indicate a particular VPC, a new VPC may be created for the client and used for configuring components of the TPVE.

Depending on the TVF, different kinds of administrative nodes or components may have to be set up at the VCS for a TPVE, e.g., on respective VCS compute instances in the VPC chosen for the TPVE. A CreateTPVEAdminNodes request 918 may be sent to the VCS requesting the launch of the administration components such as one or more external connectivity managers, an administration controller, a TVF API handler, an intra-TPVE connectivity manager, a security manager and the like. In some embodiments, a configuration manager of the VCS 912 may choose or launch respective compute instances and then run the administrative components on those compute instances. A TPVEAdminNodesCreated message 919 may be sent to the client after the administrative nodes are set up. In other embodiments, the administrative nodes may have to be set up in a particular TVF-defined sequence, and some operations may have to be initiated by the client after one or more steps of the sequence. For example, first an administration controller may have to be set up, then some configuration settings of the administration controller may need to be modified using client credentials to enable connectivity with other administrative components, then an intra-TPVE connectivity manager may have to be set up and linked to the administration controller, and so on. In such scenarios, separate APIs may be implemented by the VCS for individual ones of the administration components and invoked by the client in the expected order demanded by the TVF. In one embodiment, the CreateTPVEAdminNodes request may specify one or more categories of VCS compute instances which are to be used for the different administrative nodes of the TPVE. In some embodiments, one or more of the administrative nodes may be set up in high-availability or fault-tolerant modes based on availability requirements specified by the client, with one active node and one or more non-active nodes on respective compute instances, or with geographically distributed replicas of one or more nodes.

According to some embodiments, a client may submit one or more ConfigureSubnets requests 927 via programmatic interfaces 977 for a specified TPVE, and the VCS may establish a TVF-dependent number of subnets within the VPC chosen for the TPVE. For example, as discussed earlier, a private connectivity subnet (PRCS), a public connectivity subnet (PUCS), an administrative/management subnet, a tunneling endpoints subnet (TES) and/or additional subnets may be created. Each subnet may be assigned a CIDR block or range, selected for example by the VCS configuration manager or specified by the client. A set of VNIs may also be created within (e.g., assigned network addresses of) the respective subnets in some embodiments, and a SubnetsConfigured message 929 may be sent to the client. In some embodiments, respective groups of VNIs and/or software-defined logical networking intermediaries such as gateways may also be created automatically by the VCS configuration manager within individual ones of the subnets, e.g., to enable the different kinds of network traffic types illustrated in FIG. 3.

A ConfigureRouteServers request 931 may be sent by the client in some embodiments to the VCS, requesting the establishment of one or more route servers (e.g., a public route server and/or a private route server similar to the route servers shown in FIG. 5) for the TPVE. The requested set of route servers may be set up at the VPC, and a RouteServersConfigured message 933 may be sent to the client in the depicted embodiment. In at least some embodiments, routing information exchange sessions with administrative nodes such as active and passive ECMs of the TPVE may also be established and verified before the RouteServersConfigured message is sent to the client. In one embodiment, one or more route servers may be set up in the VPC automatically by the VCS, e.g., without receiving an explicit ConfigureRouteServers request.

For some types of TPVEs, individual ones of the "hosts" used for running VMs of the TPVE may in general have similar networking requirements—e.g., each of the hosts may have to send encapsulated data messages to an ECM via one VLAN, receive administrative commands via another VLAN, send remote storage-related requests via a third VLAN, and so on. In various embodiments, such networking requirements may have to be mapped to underlying VCS constructs such as subnets and VNIs. A CreateTPVEHostConfigTemplate request 941 specifying the kinds of network traffic that the TPVE VM hosts are to support (e.g., expressed as a list of VLANs) may be sent to the VCS by the client in one such embodiment. A template representing the common networking requirements of the different "hosts" may then be generated at a VCS configuration manager and sent to the client in a ConfigTemplateCreated message 943.

In the VCS implementation of a TPVE, as indicated earlier, compute instances of a selected type, such as bare metal instances, may be used as the TPVE VM hosts. On each such compute instance within the VPC, a hypervisor of the TPVE may be launched at the request of the client, and the configuration of the hypervisor may have to be modified in accordance with the host configuration template created at the request of the client. A ConfigureTVFHostsUsingTemplate request 947, with a TPVE host configuration template as a parameter, may be submitted by the client to set up VPC compute instances as TPVE VM hosts. In some embodiments, the client may indicate a particular category of VCS compute instances which is to be used for the TPVE VMs, and/or provide a pointer to the TPVE hypervisor software which is to be run at the compute instances. In various embodiments, a respective VCS configuration agent (an overlay hypervisor configuration agent) may be launched by the VCS configuration manager at individual ones of the compute instances that are to be used to run TPVE VMs, and the TPVE host configuration template may be provided to the agents. The agents may then modify the configuration of the hypervisor at the compute instance in accordance with the template to enable the desired networking configuration for the TPVE VMs and to enable the hypervisor to route network traffic of the TPVE VMs using the underlay VPC network constructs. For example, in one embodiment, one or more virtual switches (kernel-based layer 2 software switches) may be configured for the hypervisor, one or more virtual ports (associated with respective VLANs) may be defined on individual virtual switches, vmkernel adapters may be associated with the virtual ports, MAC addresses may be assigned to virtual network interface cards (vNICs) of the hypervisor, and so on. After the agent has performed the configuration tasks on the hypervisor and/or other components of the VCS compute instances) chosen to host TPVE VMs, a HostsConfigured message 949 may be sent to the client in some embodiments. The client may then issue API commands or requests of the TVF, e.g., to an API handler of the TPVE, to launch and manage TPVE VMs as desired.

According to at least one embodiment, the VCS may collect various metrics pertaining to performance of TPVE components. Such metrics may include, for example, resource utilization levels at the compute instances used for TPVE VMs and for administrative nodes, network latencies for packets corresponding to one or more of the traffic categories shown in FIG. 3, and so on. A client may submit a request for such metrics via one or more GetTPVEMetrics requests 951 in some embodiments. The corresponding metrics may be sent to the client in one or more MetricSets messages 952 in some embodiments. In at least some embodiments, programmatic interactions pertaining to TPVEs, other than those shown in FIG. 9, may be supported by a VCS.

Figure 10:
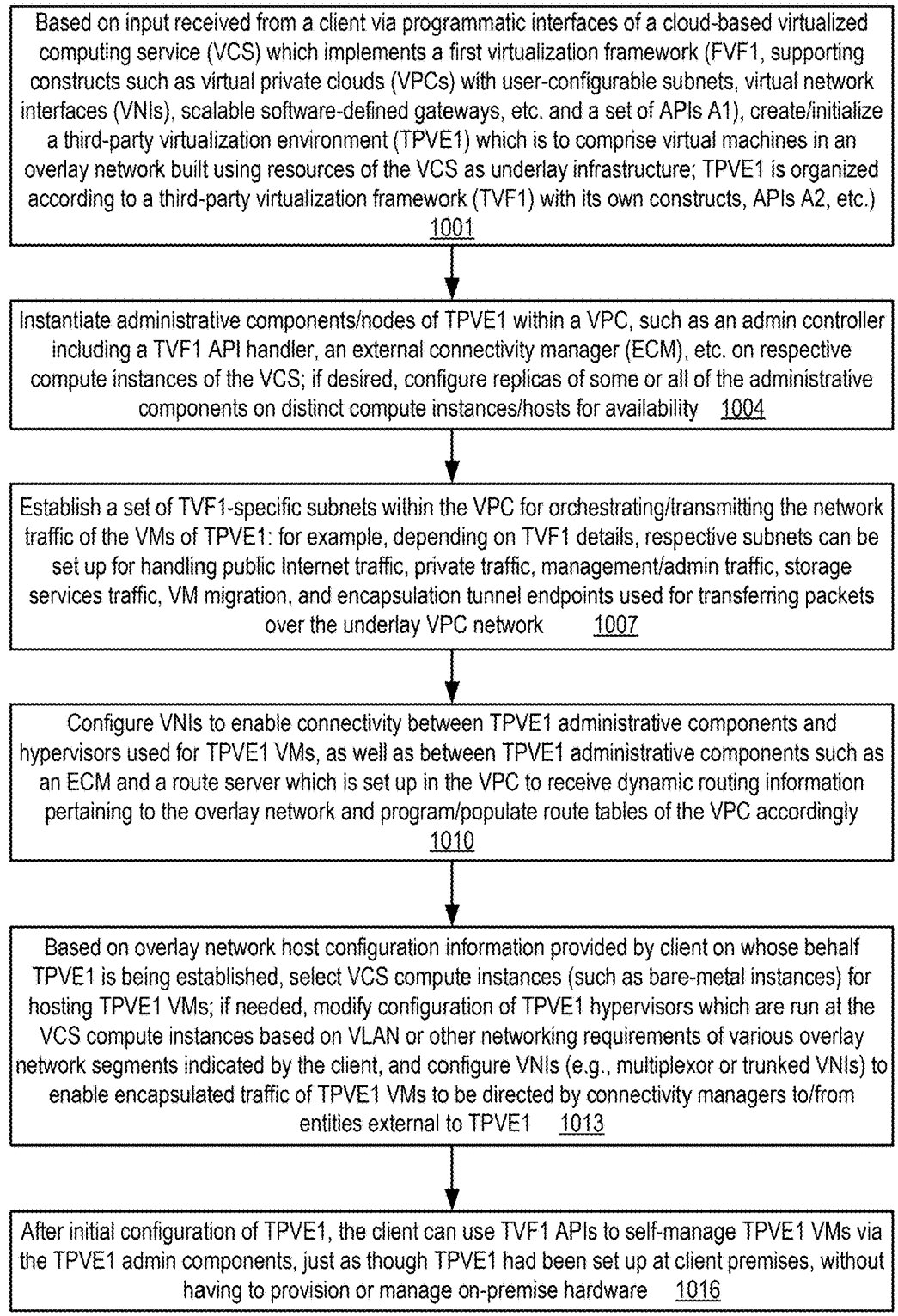
FIG. 10 is a flow diagram illustrating aspects of operations, pertaining to the configuration of overlay networks using resources of a cloud computing environment, according to at least some embodiments.

FIG. 10 is a flow diagram illustrating aspects of operations, pertaining to the configuration of overlay networks using resources of a cloud computing environment, according to at least some embodiments. As shown in element 1001, in response to input received via one or more programmatic interfaces of a cloud-based VCS which implements a first virtualization framework FVF1, a third-party virtualization environment (TPVE1) or overlay network which is to utilize the VCS resources as underlying infrastructure (an underlay network) for running and managing virtual machines may be created/initialized. FVF1 may support a collection of logical constructs such as VPCs with user-configurable subnets, VNIs, scalable software-defined gateways of several types such as Internet gateways, transit gateways, virtual private gateways or NAT gateways, and a set of APIs API1 for managing and accessing compute instances and other VCS resources. TPVE1 may be organized according to a third-party virtualization framework TVF1 with its own logical constructs such as logical network segments, virtual machines, virtual switches and the like.

A set of administrative or control plane nodes/components of TPVE1 may be instantiated at respective compute instances of the VCS within a selected VPC (element 1004), e.g., by a VCS configuration manager based on programmatic input received from the customer on whose behalf TPVE1 is established. Such administrative nodes may include, for example, an administration controller comprising an API handler of TVF1 and one or more external connectivity managers (ECMs) responsible for routing packets between the TPVE1 virtual machines and entities outside TPVE1. If desired by the customer (e.g., as indicated via API parameters), replicas of some or all of the administrative components may be created at distinct compute instances and/or in distinct geographical locations or availability zones to ensure high availability in some embodiments.

In at least some embodiments, a set of TVF1-specific subnets may be established within the VPC for orchestrating, segregating, and/or transmitting the network traffic of the VMs of TPVE1 (element 1007). For example, depending on TVF1 details, respective subnets can be set up for handling public Internet traffic to/from the VMs, private traffic (traffic to endpoints whose addresses are not accessible from or advertised on the public Internet), management/administration traffic, remote storage services related traffic, VM migration traffic, and/or for endpoints of encapsulation tunnels used for transferring packets over the underlying VPC network between ECMs and the VMs.

In various embodiments, a set of VNIs may be established and attached to VCS compute instances and/or logical networking intermediaries such as VCS gateways of the VPC (element 1010). Such VNIs may enable connectivity between different TPVE administrative components/nodes, TPVE administrative components and TPVE hypervisor, TPVE administrative components and one or more route servers set up in the VPC, and so on. One example of such a collection of VNIs is shown in FIG. 4. The route server(s) may be responsible for obtaining routing metadata (e.g., IP addresses assigned to the TPVE1 VMs) from a TPVE1 administrative node, and modifying one or more route tables of the VPC or associated gateways accordingly to ensure that packets to/from the RPVE1 VMs are delivered to the correct underlying VPC resources and VCS pathways.

Depending on the computing and networking needs of the applications that the customer wishes to run using the TPVE1 VMs in the overlay network, host configuration templates or similar configuration metadata may be provided by the customer to the VCS in various embodiments. Based on such configuration information, VCS compute instances (such as bare metal instances) in the VPC may be selected for hosting TPVE1 VMs (element 1013). TVF1 hypervisors may be launched at such compute instances, and the configuration of the hypervisors may be modified based on the networking requirements (e.g., a VLAN layout) of one or more customer-defined network segments of TPVE1. In some embodiments, one or more trunked or multiplexor VNIs may be attached to the compute instances that are to be used for hosting TPVE1 VMs, with corresponding branch VNIs configured in one or more of the VPC subnets. Encapsulation tunnels of a protocol such as Geneve may be established between the VM-hosting compute instances and one or more ECMs to enable traffic of the VMs to be sent via the ECM to entities external to TPVE1 in some embodiments.

After the initial configuration of TPVE1 has been set up, the customer or client can use TVF1 APIs to manage TPVE1 VMs via the administrative nodes/components, just as though TPVE1 has been set up at the client's premises (element 1016). The underlying hardware (e.g., servers, network links, etc.) may not have to be managed by the client, as they are managed by the VCS.

It is noted that in various embodiments, some of the operations shown in the flow diagram of FIG. 10 may be implemented in a different order than that shown in the figure, or may be performed in parallel rather than sequentially. Additionally, some of the operations shown in these flow diagrams may not be required in one or more implementations.

Figure 11:
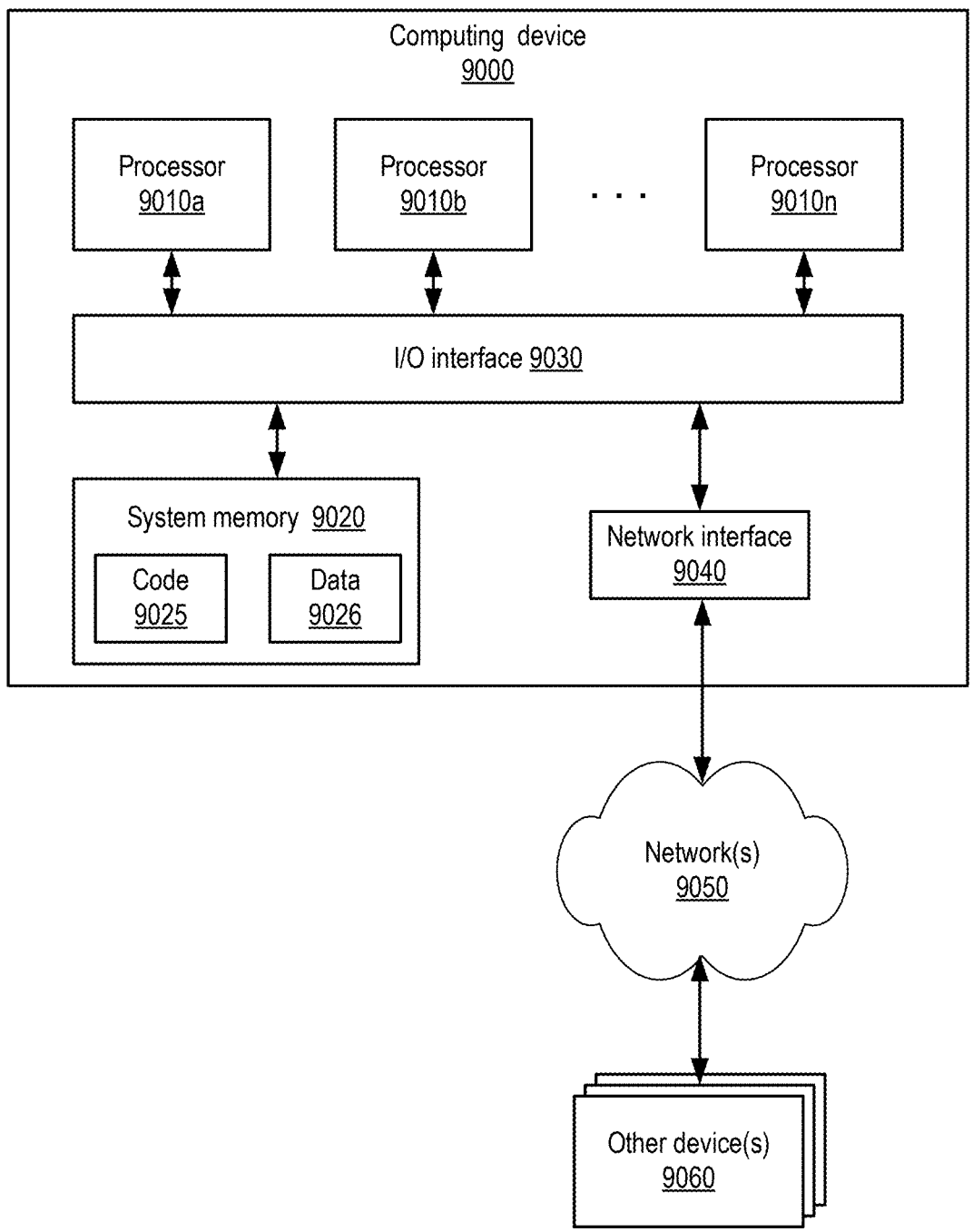
FIG. 11 is a block diagram illustrating an example computing device that may be used in at least some embodiments.

In at least some embodiments, a server that implements the types of techniques described herein (e.g., including the described functionality of various VCS components including configuration managers, virtualization hosts and the like), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
a configuration manager of a virtualized computing service (VCS) of a cloud computing environment; and
a set of virtualization hosts of the VCS;
wherein the configuration manager is configured to:
instantiate, on a first compute instance within a virtual private cloud (VPC) established on behalf of a customer of the VCS, a first external connectivity manager (ECM) of an overlay network set up at the request of the customer using resources of the VCS as an underlay network, wherein the first compute instance runs on a first virtualization host of the set of virtualization hosts;
programmatically attach, to the first compute instance, (a) a first virtual network interface (VNI) of a private connectivity subnet configured within the VPC and (b) a second VNI of a tunneling subnet configured within the VPC;

instantiate a hypervisor of the overlay network on a second compute instance within the VPC, wherein the second compute instance runs on a second virtualization host of the set of virtualization hosts;

programmatically attach, based at least in part on a configuration template received from the customer, a third VNI of the tunneling subnet to the second compute instance;

cause a route server to modify a particular route table associated with the VPC, based at least in part on routing information received at the route server from the first ECM, wherein the routing information indicates a network address range chosen by the customer for virtual machines of the overlay network;

cause, based at least in part on the modified particular route table, a network packet directed to a virtual machine of the overlay network from a source outside the overlay network to be routed to the first ECM via the first VNI, wherein the virtual machine is launched by the hypervisor at the second compute instance, and wherein the virtual machine is assigned an address from the network address range; and cause the network packet to be received at the virtual machine from the first ECM via an encapsulation tunnel linking the second VNI and the third VNI.

2. The system as recited in claim 1, wherein the second compute instance is a bare-metal instance.

3. The system as recited in claim 1, wherein the routing information is received at the route server from the first ECM via a version or variant of the Border Gateway Protocol (BGP).

4. The system as recited in claim 1, wherein the configuration manager is further configured to:

instantiate, on a third compute instance of the VCS, based at least in part on an availability requirement indicated by the customer, a second ECM of the overlay network, wherein the third compute instance runs on a third virtualization host of the set of virtualization hosts; and store metadata indicating (a) the first ECM as an active ECM of a set of ECMs of the overlay network, and (b) the second ECM as a passive ECM of the set of ECMs, wherein the second ECM is configured to assume at least a portion of functionality of the first ECM in the event of a failure associated with the first ECM.

5. The system as recited in claim 1, wherein the source outside the overlay network comprises a resource outside the cloud computing environment.

6. A computer-implemented method for configuring an overlay network using resources of a cloud computing environment as an underlay network, comprising:

instantiating, on a first computing resource within the cloud computing environment, an external connectivity manager (ECM) of the overlay network;

instantiating a hypervisor of the overlay network on a second computing resource within the cloud computing environment;

modifying, by a route server of the cloud computing environment, a particular route table of the cloud computing environment based at least in part on routing information received at the route server from the ECM, wherein the routing information indicates a network address range chosen by a customer for virtual machines of the overlay network;

establishing an encapsulation tunnel between the first computing resource and the second computing resource;

routing, to the ECM, based at least in part on the modified particular route table, a network packet directed to a virtual machine of the overlay network from a source outside the overlay network, wherein the virtual machine is launched by the hypervisor at the second computing resource, and wherein the virtual machine is assigned an address from the network address range; and delivering the network packet to the virtual machine from the ECM via the encapsulation tunnel.

7. The computer-implemented method as recited in claim 6, further comprising:

establishing a virtual private cloud (VPC) within which the overlay network is to be configured; and launching the first and second computing resources within the VPC.

8. The computer-implemented method as recited in claim 6, further comprising:

programmatically attaching a first virtual network interface (VNI) of the cloud computing environment to the first computing resource, wherein the first VNI is indicated as a target in the modified particular route table, and wherein the network packet is routed to the ECM via at least the first VNI.

9. The computer-implemented method as recited in claim 8, further comprising:

creating a private connectivity subnet of the cloud computing environment for the overlay network, wherein the first VNI is configured within the private connectivity subnet; and configuring a second VNI of the cloud computing environment within the private connectivity subnet, wherein the second VNI is associated with a gateway of the cloud computing environment, wherein the network packet is received at the gateway from the source, and wherein the network packet is routed to the ECM via the second VNI.

10. The computer-implemented method as recited in claim 9, wherein the gateway comprises one or more of: (a) a virtual private gateway configured to transmit network packets to and from a customer premise outside the cloud computing environment or (b) a transit gateway configured to transmit network packets between VPCs of the cloud computing environment.

11. The computer-implemented method as recited in claim 8, further comprising:

creating a public connectivity subnet of the cloud computing environment for the overlay network, wherein the first VNI is configured within the public connectivity subnet; and configuring a second VNI of the cloud computing environment within the public connectivity subnet, wherein the second VNI is associated with an Internet gateway of the cloud computing environment, wherein the network packet is received at the Internet gateway from the source, and wherein the network packet is routed to the ECM via the second VNI.

12. The computer-implemented method as recited in claim 11, further comprising:

transmitting, by the Internet gateway, the network packet to the ECM without performing network address translation (NAT) to transform a destination address of the network packet from a public address to a private address within the cloud computing environment.

13. The computer-implemented method as recited in claim 6, further comprising:
  programmatically attaching a first VNI of the cloud computing environment to the first computing resource, and a second VNI of the cloud computing environment to the second computing resource, wherein the encapsulation tunnel is established using the first and second VNIs.

14. The computer-implemented method as recited in claim 13, wherein programmatically attaching the second VNI to the second computing resource comprises attaching a multiplexor VNI to the second computing resource.

15. The computer-implemented method as recited in claim 6, wherein the second computing resource is a bare-metal instance of the cloud computing environment.

16. A non-transitory computer-accessible storage medium storing program instructions that when executed on a processor:
  instantiate, on a first computing resource within a cloud computing environment, an external connectivity manager (ECM) of an overlay network set up using resources of the cloud computing environment as an underlay network;
  modify, by a route server of the cloud computing environment, a particular route table of the cloud computing environment, based at least in part on routing information received at the route server from the ECM, wherein the routing information indicates a network address range chosen by a customer for virtual machines of the overlay network;
  establish an encapsulation tunnel between the first computing resource and a second computing resource, wherein the second computing resource comprises a hypervisor of the overlay network;
  route, to the ECM, based at least in part on the modified particular route table, a network packet directed to a virtual machine of the overlay network from a source outside the overlay network, wherein the virtual machine is launched by the hypervisor at the second computing resource, and wherein the virtual machine is assigned an address from the network address range; and
  deliver the network packet to the virtual machine from the ECM via the encapsulation tunnel.

17. The non-transitory computer-accessible storage medium as recited in claim 16, wherein the routing information is received at the route server via a message formatted according to the Border Gateway Protocol (BGP).

18. The non-transitory computer-accessible storage medium as recited in claim 16, wherein the cloud computing environment comprises a virtualized computing service implementing a first virtualization framework with a first set of customer-accessible application programming interfaces (APIs), the non-transitory computer-accessible storage medium storing further program instructions that when executed on the processor:
  launch an API handler of a second virtualization framework on a particular compute instance of the virtualized computing service, wherein the particular compute instance is launched in response to a request submitted to the virtualized computing service using the first set of customer-accessible APIs, wherein the second virtualization framework supports a second set of customer-accessible APIs which differ from the first set of APIs, and wherein the virtual machine is launched in response to a request submitted to the API handler using the second set of customer-accessible APIs.

19. The non-transitory computer-accessible storage medium as recited in claim 16, storing further program instructions that when executed on the processor:
  launch a hypervisor configuration agent of the cloud computing environment at the second computing resource; and
  modify, by the hypervisor configuration agent, a configuration of the hypervisor of the overlay network to enable the hypervisor to route traffic of the virtual machine using the underlay network.

20. The non-transitory computer-accessible storage medium as recited in claim 19, wherein the configuration of the hypervisor is modified based at least in part on information received at the hypervisor configuration agent regarding one or more virtual local area networks (VLANs) of the overlay network.

* * * * *